United States Patent
Lee et al.

(10) Patent No.: US 10,089,332 B2
(45) Date of Patent: Oct. 2, 2018

(54) METHOD AND ELECTRONIC DEVICE FOR CLASSIFYING CONTENTS

(71) Applicant: Samsung Electronics Co., Ltd., Suwon-si (KR)

(72) Inventors: Hee-Kuk Lee, Suwon-si (KR); Dae-Kyu Shin, Suwon-si (KR); Seong-Ho Cho, Seoul (KR); Ik-Hwan Cho, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 485 days.

(21) Appl. No.: 14/738,524

(22) Filed: Jun. 12, 2015

(65) Prior Publication Data

US 2016/0062993 A1     Mar. 3, 2016

(30) Foreign Application Priority Data

Aug. 21, 2014  (KR) .................. 10-2014-0109059

(51) Int. Cl.
*G06F 17/30* (2006.01)
*G06K 9/62* (2006.01)

(52) U.S. Cl.
CPC ....... *G06F 17/3028* (2013.01); *G06K 9/6282* (2013.01)

(58) Field of Classification Search
CPC ............. G06F 17/3028; G06F 17/30; G06F 17/30247; G06F 17/30277; G06F 17/30058; G06F 17/30601; G06F 17/30309; G06F 17/30371; G06F 17/30351; G06F 21/44; G06F 9/547; G06F 9/485; G06F 9/466; G06F 17/30194; G06F 9/463; G06F 9/5027; G06F 17/30575; G06K 9/6282; G06K 9/6267; G06K 9/46; G06K 9/628; G06K 9/4604; G06K 9/4652; G06Q 30/0601; G06Q 30/0224; H04L 51/32

See application file for complete search history.

(56) References Cited

U.S. PATENT DOCUMENTS 5,930,788 A * 7/1999 Wical ................ G06F 17/30707
                                                          707/E17.09
6,385,619 B1    5/2002 Eichstaedt et al.
(Continued)

FOREIGN PATENT DOCUMENTS

CN    102 156 871 A    8/2011

OTHER PUBLICATIONS

Communication with European Search Report dated Jul. 13, 2017 corresponding to European Application No. 15833504.2.
(Continued)

*Primary Examiner* — Anh Ly
(74) *Attorney, Agent, or Firm* — McAndrews, Held & Malloy, Ltd.

(57) ABSTRACT

A method of classifying contents comprising configuring one or more categories in a hierarchical structure, mapping one or more contents and the one or more categories based on at least one piece of information on the one or more contents and information on the one or more categories, and updating the hierarchical structure of the categories based on a preset condition when content-related information of each category determined according to the mapping meets the preset condition.

18 Claims, 12 Drawing Sheets

(56) References Cited

U.S. PATENT DOCUMENTS

| | | | |
|---|---|---|---|
| 8,892,594 B1* | 11/2014 | Khafizov | G06F 17/30864 707/704 |
| 9,697,638 B2* | 7/2017 | Shinohara | G06T 15/005 345/429 |
| 9,769,382 B2* | 9/2017 | Kim | H04N 5/23245 348/216.1 |
| 2002/0143797 A1 | 10/2002 | Zhang et al. | |
| 2003/0021468 A1* | 1/2003 | Jia | G06T 11/60 382/162 |
| 2003/0088639 A1* | 5/2003 | Lentini | G06F 17/3092 709/217 |
| 2004/0024769 A1 | 2/2004 | Forman et al. | |
| 2005/0076365 A1* | 4/2005 | Popov | H04N 7/163 725/46 |
| 2006/0050166 A1* | 3/2006 | Sonoda | H04N 1/2112 348/333.01 |
| 2007/0126793 A1* | 6/2007 | Yamakado | G06F 17/212 347/43 |
| 2007/0260529 A1* | 11/2007 | Furuno | G06Q 30/06 705/26.8 |
| 2007/0282908 A1* | 12/2007 | Van der Meulen | G06F 17/30997 707/E17.044 |
| 2008/0140685 A1* | 6/2008 | Kim | G06F 21/10 707/E17.125 |
| 2008/0172446 A1* | 7/2008 | Donovan | H04N 21/25875 709/202 |
| 2009/0097748 A1* | 4/2009 | Lee | G06F 17/30047 382/173 |
| 2009/0254572 A1* | 10/2009 | Redlich | G06Q 10/06 707/E17.032 |
| 2010/0185866 A1* | 7/2010 | Wang | H04L 63/126 713/176 |
| 2010/0250497 A1* | 9/2010 | Redlich | G06Q 10/06 707/661 |
| 2011/0173186 A1 | 7/2011 | Morscher et al. | |
| 2011/0282858 A1 | 11/2011 | Karidi et al. | |
| 2012/0047138 A1* | 2/2012 | Akagi | G06F 17/30265 707/736 |
| 2012/0254188 A1* | 10/2012 | Koperski | G06F 17/30663 707/740 |
| 2013/0184075 A1* | 7/2013 | Kim | A63F 13/537 463/31 |
| 2013/0236081 A1 | 9/2013 | Nakamura | |
| 2014/0010458 A1* | 1/2014 | Nakamura | G06F 17/30244 382/195 |
| 2014/0340391 A1* | 11/2014 | Shinohara | G06T 17/005 345/419 |
| 2014/0340392 A1* | 11/2014 | Shinohara | G09G 5/14 345/419 |
| 2015/0178754 A1* | 6/2015 | Liu | G06Q 30/0217 705/14.19 |
| 2015/0193804 A1* | 7/2015 | Liu | G06Q 30/0224 705/14.25 |
| 2016/0080653 A1* | 3/2016 | Kim | H04N 5/23245 348/216.1 |
| 2017/0046316 A1* | 2/2017 | Spiegel | G06F 3/0484 707/736 |

OTHER PUBLICATIONS

Pang-Ning Tan et al, "Chapter 4, Classification: Basic Concepts, Decision Trees, and Model Evaluation", Introduction to Data Mining, Feb. 5, 2005 (Feb. 5, 2005), pp. 145-205, XP055200328, ISBN: 0321321367 Retrieved from the Internet: URL:http://www-users.cs.umn.edu/~kumar/dmbook/ch4.pdf [retrieved on Jul. 6, 2015].

* cited by examiner

METHOD AND ELECTRONIC DEVICE FOR CLASSIFYING CONTENTS

CROSS-REFERENCE TO RELATED APPLICATION

This application claims priority under 35 U.S.C. § 119(a) to Korean Application Serial No. 10-2014-0109059, which was filed in the Korean Intellectual Property Office on Aug. 21, 2014, the entire content of which is hereby incorporated by reference.

TECHNICAL FIELD

The present disclosure relates to an electronic device and a method of classifying contents in an electronic device.

BACKGROUND

As the performance of computers has been enhanced, digital signal processing has become possible and digital image processing has become the most general type of image processing. There are various methods for digital image processing, and the methods are commercialized in many application fields for space observation, medical care, picture analysis, factory automation, military uses, design, and various pattern recognition.

Digital image processing is generally more useful compared to analog image processing. For example, digital image processing may apply a broader algorithm to input contents and prevent problems such as noise and signal distortion generated during the processing.

Digital image processing may include fields in image enhancement, image restoration, image reconstruction, image compression, and image recognition.

The above information is presented as background information only to assist with an understanding of the present disclosure. No determination has been made, and no assertion is made, as to whether any of the above might be applicable as prior art with regard to the present disclosure.

BRIEF SUMMARY

Through image recognition, images may be classified. For example, a method of classifying images passes through a preprocessing operation in which noise and lens distortion are removed from an original image, a feature extraction phase in which a feature point is found in the image in order to increase accuracy, and an operation for learning a classification function for images which are references of classification by using the extracted feature point. An image to be classified next may be classified into a particular category through the completely learned classification function.

For example, during category selection, when steps of categories are configured to be too minute, the number of categories increases, causing a user to have difficulty selecting a category which the user desires to find. However, when the number of categories decreases and thus a range to be classified is large, there is too much data included in each category, thus causing the user to have difficulty finding data which the user desires.

In another example, since contents possessed by individuals are different and dispersion between the categories is very large, a conventional uniform method of classifying categories is not practical.

Various embodiments of the present disclosure may provide a content classification method and an electronic device which may re-configure a category structure according to contents mapped to each category.

In accordance with an aspect of the present disclosure, an electronic device is provided. The electronic device comprises: a storage unit for storing information on a plurality of categories configured in a hierarchical structure; and a controller for making a control to map one or more contents and one or more categories based on at least one piece of information on the one or more contents and information on the categories, and, when content-related information of each category determined according to the mapping meets a preset condition, to update the hierarchical structure of the categories based on the preset condition.

In accordance with another aspect of the present disclosure, a method is provided. The method comprises: configuring one or more categories in a hierarchical structure; mapping one or more contents and the one or more categories based on at least one piece of information on the one or more contents and information on the categories; and when content-related information of each category determined according to the mapping meets a preset condition, updating the hierarchical structure of the categories based on the preset condition.

An electronic device and a content classification method by an electronic device according to various embodiments of the present disclosure may change a category structure according to contents mapped to each category having a hierarchical structure and re-classify the contents, so that a user can easily use the contents.

According to various embodiments of the present disclosure, the number of contents included in each category can be properly maintained according to the re-classification of contents, so that the user can easily use the contents.

According to various embodiments of the present disclosure, with respect to contents showing distribution of each of various categories according to user information (e.g., nationality, sex, age, hobby, and the like), a category in which the user is relatively more interested (e.g., a category having a large number of contents or frequently accessed contents) may be further subdivided and displayed.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features, and advantages of the present disclosure will be more apparent from the following detailed description taken in conjunction with the accompanying drawings, in which.

Throughout the drawings, like reference numerals will be understood to refer to like parts, components, and structures.

DETAILED DESCRIPTION

Figure 1:
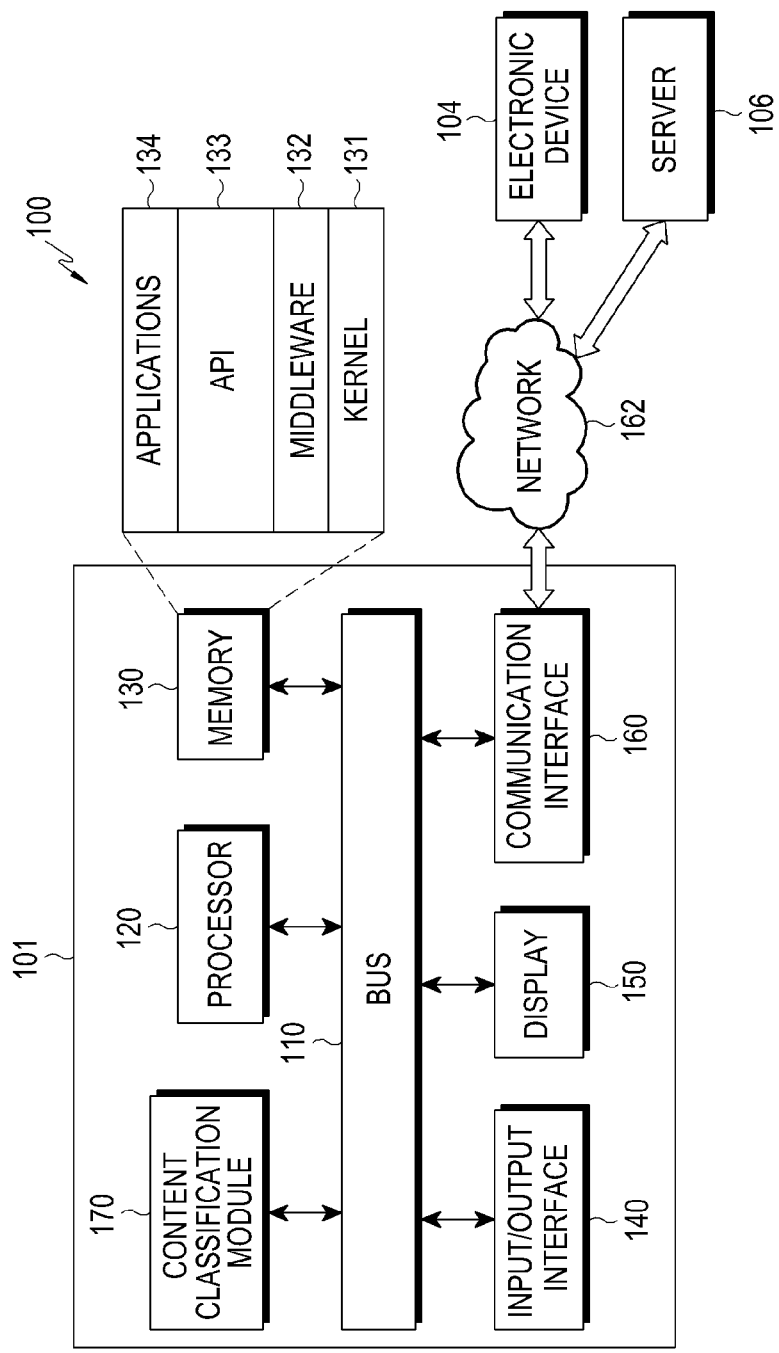
FIG. 1 illustrates a network environment according to various embodiments of the present disclosure.

Hereinafter, various embodiments of the present disclosure will be described with reference to the accompanying drawings. The present disclosure may have various embodiments, and modifications and changes may be made therein. Therefore, the present disclosure will be described in detail with reference to particular embodiments shown in the accompanying drawings. However, it should be understood that the present disclosure is not limited to the particular embodiments, but includes all modifications, equivalents, and/or alternatives within the spirit and scope of the present disclosure. In the description of the drawings, identical or similar reference numerals are used to designate identical or similar elements.

In the present disclosure, the expression "include" or "may include" refers to existence of a corresponding function, operation, or element, and does not limit one or more additional functions, operations, or elements. Further, as used in various embodiments of the present disclosure, the terms "include", "have", and their conjugates are intended merely to denote a certain feature, numeral, step, operation, element, component, or a combination thereof, and should not be construed to initially exclude the existence of or a possibility of addition of one or more other features, numerals, steps, operations, elements, components, or combinations thereof.

The term "or" in various embodiments of the disclosure means the inclusion of at least one or all of the disclosed elements. For example, the expression "A or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although both of them are user devices. For example, without departing from the scope of the present disclosure, a first structural element may be named a second structural element. Similarly, the second structural element also may be named the first structural element.

When an element is referred to as being "coupled" or "connected" to any other element, it should be understood that not only the element may be directly coupled or connected to the other element, but also a third element may be interposed therebetween. Contrarily, when an element is referred to as being "directly coupled" or "directly connected" to any other element, it should be understood that no element is interposed therebetween.

The terms as used in various embodiments of the present disclosure are merely for the purpose of describing particular embodiments and are not intended to limit the present disclosure. As used herein, singular forms may include plural forms as well unless the context clearly indicates otherwise.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in various embodiments of the present disclosure.

An electronic device according to various embodiments of the present disclosure may be, but is not limited to, a device including a function of a camera module or a communication. For example, the electronic device may include at least one of a smartphone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), an MP3 player, a mobile medical appliance, a camera, and a wearable device (e.g. a Head-Mounted-Device (HMD) such as electronic glasses, electronic clothes, an electronic bracelet, an electronic necklace, an electronic appcessory, electronic tattoos, or a smartwatch).

According to some embodiments, the electronic device may be a smart home appliance with a communication function. For example, the smart home appliance may include at least one of a television, a digital video disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic photo frame.

According to some embodiments, the electronic device may include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), automotive infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) of a shop.

According to some embodiments, the electronic device may include at least one of a part of furniture or a building/structure having a communication function, an electronic board, an electronic signature receiving device, a projector, and various kinds of measuring instruments (e.g., a water meter, an electric meter, a gas meter, a radio wave meter, and the like). The electronic device according to various embodiments of the present disclosure may be a combination of one or more of the aforementioned various devices. Further, the electronic device according to various embodiments of the present disclosure may be a flexible device. Further, it will be apparent to those skilled in the art that the electronic device according to various embodiments of the present disclosure is not limited to the aforementioned devices.

In various embodiments of the present disclosure described below, "contents" may include pictures or moving images and mean objects which can be classified according to each category within an electronic device, but are not limited to particular forms or types. Accordingly, any objects which can be classified according to each category as well as the pictures or moving images may be included in contents according to embodiments of the present disclosure. Further, for example, the contents may be stored in the file form, but various embodiments of the present disclosure are not limited thereto.

In various embodiments of the present disclosure described below, "category" may mean a unit for classifying the contents, and may be expressed as, for example, at least one word or keyword. Further, each category may be configured in a hierarchical structure and one category may be connected to at least another category (e.g., a higher category or a lower category) according to embodiments of the present disclosure.

Hereinafter, an electronic device according to various embodiments of the present disclosure will be described with reference to the accompanying drawings. The term "user" used in the various embodiments may refer to a person or a device using the electronic device.

FIG. 1 illustrates a network environment 100 including an electronic device 101 according to various embodiments. Referring to FIG. 1, the electronic device 101 may include a bus 110, a processor 120, a memory 130, an input/output interface 140, a display 150, a communication interface 160, and a content classification module 170.

The bus 110 may be a circuit to connect the above-described components with each other and to transfer communication (e.g., control messages) among the above-described components.

The processor 120 may receive a command from other components (e.g., the memory 130, the input/output interface 140, the display 150, the communication interface 160, or the content classification module 170) through the bus 110, decrypt the received command, and perform calculations or data processing according to the decrypted command.

The memory 130 may be non-transitory, and may store instructions or data received from the processor 120 or other components (e.g., the input/output interface 140, the display 150, the communication interface 160, the content classification module 170, or the like) or generated by the processor 120 or other components. The memory 130 may include programming modules, for example, a kernel 131, middleware 132, an Application Programming Interface (API) 133, applications 134, or the like. The aforementioned programming modules may be formed of software, firmware, hardware, or a combination of at least two thereof. Further, according to various embodiments, various pieces of information (e.g., content information, category structure information, or content classification information) used by the content classification module 170 may be stored in the memory 130.

The kernel 131 may control or manage system resources (e.g., the bus 110, the processor 120, the memory 130, or the like) which are used for performing operations or functions implemented by other programming modules, for example, the middleware 132, the API 133 or the applications 134. Furthermore, the kernel 131 may provide an interface through which the middleware 132, the API 133, and the application 134 may access individual components of the electronic device 101 to control or manage them.

The middleware 132 may perform a relay function to allow the API 133 or the applications 134 to communicate with the kernel 131 to exchange data. Further, in relation to requests for an operation received from the application 134, the middleware 132 may control (e.g., scheduling or load-balancing) the requests by using, for example, a method of determining a sequence for using system resources (e.g., the bus 110, the processor 120, the memory 130, or the like) of the electronic device 101 with respect to at least one application among the applications 134.

The API 133 is an interface by which the applications 134 control functions provided from the kernel 131 or the middleware 132, and may include, for example, at least one interface or function (e.g., instructions) for a file control, a window control, an image processing, a text control, or the like.

According to various embodiments, the applications 134 may include a Short Message Service (SMS)/Multimedia Messaging Service (MMS) application, an email application, a calendar application, an alarm application, a health care application (e.g., application for measuring a quantity of exercise or blood sugar) or an application (e.g., application providing information associated with pressure, humidity or temperature). Additionally or alternatively, the applications 134 may be applications related to the exchange of information between the electronic device 101 and other electronic devices (e.g., electronic device 104). The applications related to the exchange of information may include, for example, a notification relay application for transferring predetermined information to the other electronic device (e.g., the electronic device 104) or a device management application for managing the other electronic device (e.g., the electronic device 104).

For example, the notification relay application may include a function of transmitting notification information generated by another application (e.g., the SMS/MMS application, the email application, the health care application or the environment information application) of the electronic device 101 to the other electronic device (e.g., the electronic device 104). Additionally or alternatively, the notification relay application may receive notification information from, for example, a second electronic device (e.g., the electronic device 104), and provide the same to a user. The device management application, for example, may manage (e.g., install, delete, or update) at least some functions (e.g., turning a second electronic device (e.g., the electronic device 104, or some elements) on or off, or adjusting the brightness (or resolution) of a display) of a second electronic device (e.g., the electronic device 104) that communicates with the electronic device 101, applications performed in the second electronic device (e.g., the electronic device 104), or services (e.g., a phone call service, or a messaging service) provided from the other electronic device.

According to the various embodiments, the applications 134 may include an application designated according to a property (e.g., a kind of the electronic device 101) of the second electronic device (e.g., the electronic device 104). For example, when the other electronic device is an MP3 player, the applications 134 may include an application related to the reproduction of music. Similarly, when the second electronic device is a mobile medical device, the applications 134 may include an application related to the health care. According to an embodiment, the applications 134 may include at least one of an application designated to the electronic device 101 and an application received from a second electronic device (e.g., a server 106 or the electronic device 104).

The input/output interface 140 may transfer commands or data, which are input by a user through input/output devices (e.g., sensors, keyboards, or touch screens), to the processor 120, the memory 130, the communication interface 160, or the content classification module 170 through, for example, the bus 110. For example, the input/output interface 140 may provide the processor 120 with data for a user's touch input through the touch screen. Further, through the input/output device (e.g., a speaker or a display), the input/output interface 140 may display instructions or data received from the processor 120, the memory 130, the communication interface 160, or the control classification module 170 through, for example, the bus 110. For example, the input/output interface 140 may output voice data processed by the processor 120 to the user through the speaker. For example, according to various embodiments, the input/output interface 140 may receive at least one of a request for generating contents, a request for receiving contents, a request for analyzing contents, a request for classifying, and a request for displaying classified contents from the user. The processor 120, the memory 130, or the display 150 may perform a corresponding function according to each of the requests through the input/output interface 140.

The display 150 may display various pieces of information (e.g., multimedia data or text data) for the user. Further, according to various embodiments of the present disclosure, the display 150 may display, on a screen, an input window or an input pad through which various characters, numbers, and symbols can be input into the input window in various ways. According to various embodiments, the display 150 may display one or more contents or a list of contents according to a request for displaying the contents through the input/output interface 140. When the request for displaying the content list is received, the display 150 may display each content list in updated category structure form according to various embodiments.

The communication interface 160 may connect communication between the electronic device 101 and a second electronic device (e.g., the electronic device 104 or the server 106). For example, the communication interface 160 may be connected to a network 162 through wireless or wired communication to communicate with the second electronic device. The wireless communication may include at least one of, for example, a Wireless Fidelity (Wi-Fi), a Bluetooth (BT), a Near Field Communication (NFC), a Global Positioning System (GPS) and a cellular communication (e.g., an LTE, an LTE-A, a CDMA, a WCDMA, a UMTS, a WiBro, a GSM or the like). The wired communication may include at least one of, for example, a Universal Serial Bus (USB), a High Definition Multimedia Interface (HDMI), Recommended Standard 232 (RS-232), and a Plain Old Telephone Service (POTS).

According to an embodiment, the network 162 may be a communication network. The communication network may include at least one of a computer network, the Internet, the Internet of things, and a telephone network. According to an embodiment, a protocol (e.g., a transport layer protocol, a data link layer protocol, or a physical layer protocol) for the communication between the electronic device 101 and the second electronic device may be supported by at least one of the applications 134, the API 133, the middleware 132, the kernel 131, and the communication interface 160.

According to an embodiment, the server 106 may support driving of the electronic device 101 by conducting at least one of the operations (or functions) implemented in the electronic device 101. For example, the server 106 may include a function for supporting the content classification module 170 implemented in the electronic device 101. For example, the server 106 may include at least one component of the content classification module 170, and may perform (e.g., perform as a proxy) at least one of the operations performed by the content classification module 170.

FIG. 1 illustrates that the electronic device 101 includes the communication interface 160 to communicate with the electronic device 104, the server 106, or the like through the network 162. But, according to another embodiment of the present disclosure, the electronic device 101 may be implemented to independently operate without an additional communication function.

The content classification module 170 may process at least some of the information obtained from other components (e.g., processor 120, memory 130, input/output interface 140, or communication interface 160) and provide the processed information to the user in various ways.

For example, the content classification module 170 may control at least some functions of the electronic device 101 by using the processor 120 or independently from the processor 120 so that the electronic device 101 may interwork with other electronic devices (e.g., the electronic device 104 or the server 106). According to an embodiment, at least one component of the content classification module 170 may be included in the server 106 and receive supporting of at least one operation implemented in the content classification module 170 from the server 106.

According to various embodiments, among the functions of the content classification module 170, the server 106 may perform at least one of a function for configuring a structure of a category, a function for classifying contents according to each category, a function for mapping contents to categories, and a function for updating a structure of a category according to contents mapped to categories.

The electronic device 101 may further include a camera unit (not shown), and may store pictures or images photographed by the camera unit in the memory 130 as content information.

Although the content classification module 170 is illustrated as a module separate from the processor 120 in FIG. 1, at least some of the content classification module 170 may be included in the processor 120 or the display 150, or total functions of the content classification module 170 may be included in the shown processor 120 or another processor.

Figure 2:
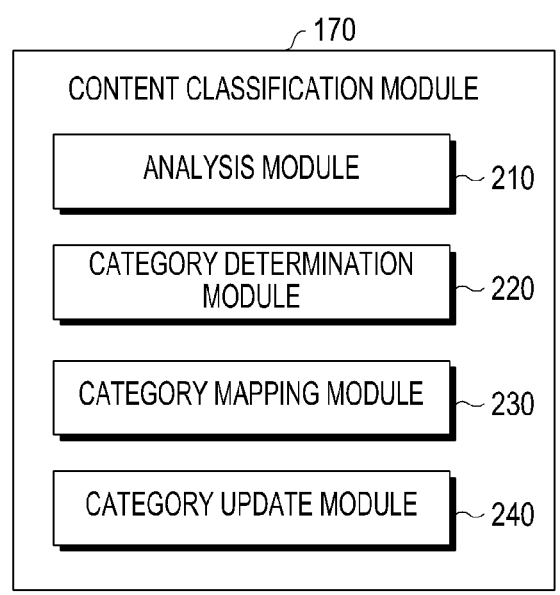
FIG. 2 illustrates an example of a configuration of a content classification module according to various embodiments of the present disclosure.

FIG. 2 is a block diagram of the content classification module 170 of an electronic device (e.g., the electronic device 101) according to various embodiments. Referring to FIG. 2, the content classification module 170 of the electronic device may include at least one of an analysis module 210, a category determination module 220, a category mapping module 230, and a category update module 240.

Hereinafter, the modules included in the content classification module 170 will be described in detail.

The content classification module 170 may be implemented in hardware or software form within the electronic device 101. According to various embodiments, various pieces of information (e.g., content information, category structure information, or content classification information) used by the content classification module 170 may be stored in the memory 130.

The content information may include contents to be classified. For example, according to various embodiments, the content classification module 170 may classify contents pre-stored in the memory 130, may store contents (e.g., photographed pictures or images) directly generated by the electronic device 101 in the memory 130 and then classify the stored contents, or may store contents downloaded from an external server (e.g., the server 106 of FIG. 1) in the memory 130 and then classify the stored contents.

The category structure information may include information on a structure of hierarchical categories (e.g., a tree structure) according to various embodiments. The category structure information may include information on a structure updated from an initial hierarchical structure by merging particular nodes.

The content classification information may include category classification information determined based on a result of the analysis of each content according to various embodiments. For example, category information of one or more contents included in the content information may be mapped to corresponding contents and stored. Another piece of category information (e.g., category information in a higher node of the corresponding node) updated from the initially classified category information according to various embodiments may be mapped and stored in the content classification information.

The analysis module 210 may perform a function of analyzing content information. Methods of analyzing the contents may include various methods. For example, when the contents correspond to image data, methods such as Scale Invariant Feature Transform (SIFT), Histogram of Oriented Gradient (HOG), Haar, Ferns, Local Binary Pattern (LBP), Modified Census Transform (MCT), Ordinal Spatial Intensity Distribution (OSID), Weber Local Descriptor (WLD), Compressed Histogram of Gradients (CHoG), Binary Robust Independent Elementary Features (BRIEF), Rotation Invariant Fast Features (RIFF), Rotation Invariant Fast Features-Polar (RIFF-Polar), DAISY, Oriented fast and Rotated Brief (ORB), and Deformation and Light Invariant (DaLI) may be used, but various embodiments are not limited thereto.

According to various embodiments of the present disclosure, when the electronic device 101 receives data generated by analyzing the contents (e.g., a result of classifying categories of contents) from a second electronic device (e.g., the server 106 of FIG. 1), the function of the analysis module 210 may be omitted.

The category determination module 220 may perform a function of classifying the contents by determining categories of the contents analyzed according to the result of the analysis by the analysis module 210. Category information of the corresponding contents determined by the category determination module 220 may be stored in the memory 130 as content classification information.

According to various embodiments of the present disclosure, when category information generated by analyzing the contents to be classified is received from a second electronic device (e.g., the server 106 of FIG. 1), the analysis module 210 or the category determination module 220 of the content classification module 170 may be omitted.

Further, according to various embodiments of the present disclosure, a result of analysis of contents provided from a second electronic device (e.g., the server 106 of FIG. 1) and a result of analysis of contents provided from the analysis module 210 of the electronic device 101 may be compared, and the comparison may be reflected in determining the category by the category determination module 220.

The category mapping module 230 may perform a function of mapping each content classified as a particular category to each hierarchical category of category structure information. Accordingly, one or more contents may be mapped to one or more categories included in the category structure information. Mapping information of the contents and the categories may be included in one piece of the category structure information and the content classification information. According to various embodiments of the present disclosure, information on contents corresponding to each of initially configured categories may be mapped and stored in the category structure information, or category information of each content may be mapped and stored in the content classification information.

The category update module 240 may perform a function of updating a hierarchical category structure initially configured according to various embodiments based on the analyzed category mapping information of the contents. According to various embodiments of the present disclosure, the updated information of the category structure may be additionally included in the category structure information or may be stored by updating pre-stored category structure information. According to various embodiments of the present disclosure, the category update module 240 may update a classified category of each content into an updated category according to the update of the category structure. The updated category information of each content may be additionally included in the content classification information, or may be stored by updating pre-stored content classification information.

Examples of a method of updating the category structure or updating the content classification information by the category update module 240 will be described in more detail with reference to FIGS. 3 to 6.

An electronic device (e.g., the electronic device 101 of FIG. 1) according to one of various embodiments of the present disclosure may include: a storage unit (e.g., the memory 130 of FIG. 1) for storing information on a plurality of categories configured in a hierarchical structure; and a controller (e.g., the processor 120 or the content classification module 170 of FIG. 1) for making a control to map one or more contents and one or more categories based on at least one piece of information on the one or more contents and information on the categories, and, when content-related information of each category determined according to the mapping meets a preset condition, to update the hierarchical structure of the categories based on the preset condition.

According to one of various embodiments of the present disclosure, an electronic device (e.g., the electronic device 101 of FIG. 1) may further include a display unit (e.g., the display 150 of FIG. 1) for classifying the one or more contents according to the updated hierarchical structure of the categories and displaying the classified contents.

According to one of various embodiments of the present disclosure, the content-related information of each category may be at least one selected from a number of contents mapped to each category, capacities of contents mapped to each category, and proportions of one or more objects included in the contents mapped to each category.

According to one of various embodiments of the present disclosure, the preset condition may be at least one selected from a condition in which a number of contents mapped to each category is different from a preset number, a condition in which the number of contents mapped to each category is larger than the preset number, a condition in which the number of contents mapped to each category is smaller than the preset number, a condition in which capacities of contents mapped to each category are larger than preset capacities, a condition in which the capacities of the contents mapped to each category are smaller than the preset capacities, a condition in which proportions of one or more objects included in the contents mapped to each category are larger than preset proportions, and a condition in which the proportions of the one or more objects included in the contents mapped to each category are smaller than the preset proportions.

According to various embodiments of the present disclosure, the preset number may vary depending on each of the one or more categories.

According to various embodiments of the present disclosure, the preset number may be configured based on a total number of contents mapped to the one or more categories.

According to various embodiments of the present disclosure, the preset number may be configured based on the number of one or more categories.

According to various embodiments of the present disclosure, the preset number may be configured based on a number of user accesses to the one or more categories.

According to various embodiments of the present disclosure, the controller (e.g., the processor 120 or the content classification module 170 of FIG. 1) may analyze one or more contents and identify categories of the contents according to a result of the analysis.

According to various embodiments of the present disclosure, the controller (e.g., the processor 120 or the content classification module 170 of FIG. 1) may receive analysis information on one or more contents from a second electronic device (e.g., the electronic device 104, or the server 106, of FIG. 1) and identify categories of the contents according to a result of the analysis.

According to various embodiments of the present disclosure, the controller (e.g., the processor 120 or the content classification module 170 of FIG. 1) may transmit one or more contents to the second electronic device (e.g., the electronic device 104, or the server 106, of FIG. 1) and receive analysis information on the transmitted contents from the second electronic device.

According to various embodiments of the present disclosure, the controller (e.g., the processor 120 or the content classification module 170 of FIG. 1) may make a control to receive the one or more contents and analysis information on the one or more contents from the second electronic device.

Figure 3:
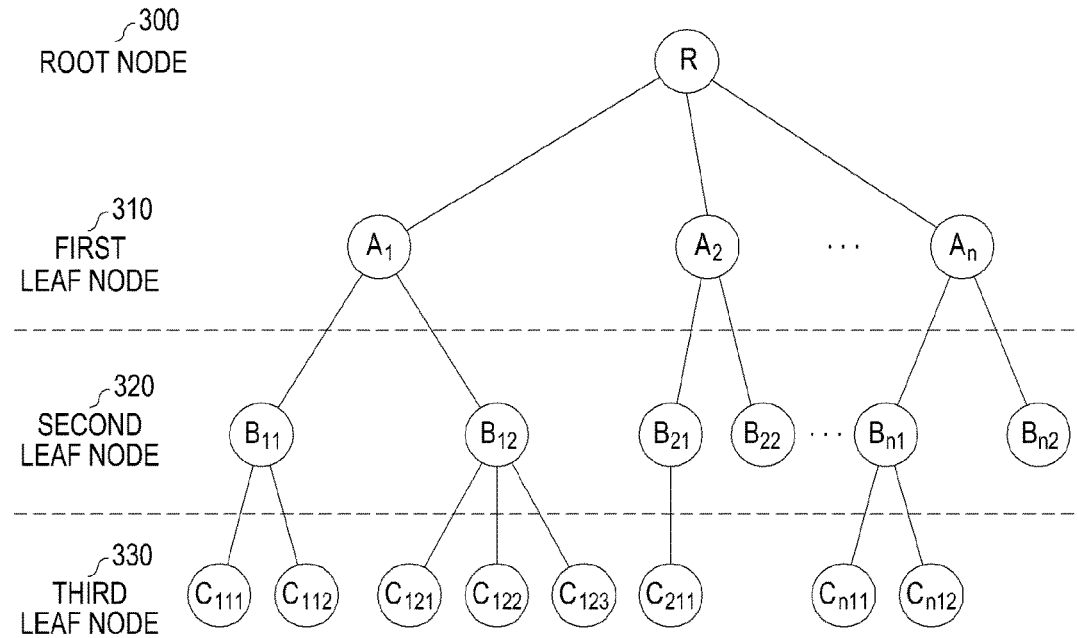
FIG. 3 illustrates a hierarchical category structure according to various embodiments of the present disclosure.

FIG. 3 illustrates a hierarchical category structure according to various embodiments of the present disclosure. Referring to FIG. 3, categories for content classification may be hierarchically configured according to various embodiments. For example, as illustrated in FIG. 3, there may be n first leaf nodes 310 (e.g., $A_1, A_2, \ldots, A_n$) underneath a root node 300. Further, there may be second leaf nodes 320 underneath the first leaf nodes 310. For example, there may be second leaf nodes $B_{11}$ and $B_{12}$ underneath a first leaf node $A_1$, there may be second leaf nodes $B_{21}$ and $B_{22}$ underneath a first leaf node $A_2$, and there may be second leaf nodes $B_{n1}$ and $B_{n2}$ underneath a first leaf node A.

Further, there may be third leaf nodes 330, e.g., $C_{111}$ and $C_{112}$ underneath the second leaf node $B_{11}$, there may be third leaf nodes $C_{121}, C_{122},$ and $C_{123}$ underneath the second leaf node $B_{12}$, there may be a third leaf node $C_{211}$ underneath the second leaf node $B_{21}$, and there may be third leaf nodes $C_{n11}$ and $C_{n12}$ underneath the second leaf node $B_{n1}$. Second leaf nodes $B_{22}$ and $B_{n2}$ may be the last nodes having no third leaf node below.

According to various embodiments of the present disclosure, each node may correspond to a particular category. Further, each lower node may be a category corresponding to a servant of a higher node linked thereto. For example, when the first leaf nodes 310 correspond to sports, the second leaf nodes 320 may be domestic football and international football. Further, international football corresponding to the second leaf node 320 may be linked to European leagues corresponding to the third leaf nodes 330. It should be noted that the terms "domestic" and "international" may be relative to any country and/or regions.

The basic hierarchical category structure as illustrated in FIG. 3 may be preset and may be changed according to updated category structure information or changed by the user.

According to various embodiments of the present disclosure, each of the contents may be mapped to a category of each node according to a result of analysis of the contents as described above. Further, the category according to the result of analysis of each of the contents may be mapped to the final node (e.g., $C_{111}, C_{112}, C_{121}, C_{122}, C_{123}, C_{211}, B_{22}, C_{n11}, C_{n12},$ or $B_{n2}$) of the leaf node in the hierarchical structure or mapped to a higher node (e.g., $A_1, A_2, A_n, B_{11}, B_{12}, B_{21},$ or $B_{n1}$) of the final node, not to the final node. For example, when finer analysis of the contents is possible, mapping may be made up to nodes of a deeper level. More specifically, for example, when a particular picture is analyzed only as a baseball picture, the picture may be mapped to the second leaf node 320. However, when the particular picture is analyzed as a Dodgers® picture in the Major League® through uniform or stadium image analysis, the corresponding picture may be mapped up to, for example, a fifth leaf node. For example, with respect to each, the analysis may be made up to the lowest node to which the contents can be mapped or up to an intermediate node, not the lowest node.

As described above, when a category of a plurality of analyzed contents are determined, each of the contents may be mapped to a node corresponding to the determined category in the hierarchical node structure illustrated in FIG. 3. When a plurality of contents are mapped to categories of nodes according to the analyzed categories, content-related information based on each category may be generated in categories based on each node according to mapped contents.

According to various embodiments, the content-related information may comprise the number of contents mapped to each category, capacities of contents mapped to each category, and a proportion of one or more objects included in the contents mapped to each category (e.g., a proportion of an area occupied by a particular object in an entire image area of each content).

According to various embodiments of the present disclosure, when the number of contents mapped to each category is calculated up to the final nodes as the content-related information, nodes to which the number of contents is mapped may be, for example, final nodes $C_{111}, C_{112}, C_{121}, C_{122}, C_{123}, C_{211}, B_{22}, Cn_{11}, Cn_{12}, B_{n2}$ in FIG. 3. For convenience of the description, the number of contents mapped to each node is configured as N, and subscript of the number (N) of contents mapped to each node is used equally to the subscript of the corresponding node. For example, the number of contents mapped to node $C_{111}$ may be indicated by $N_{111}$, and the number of contents mapped to node $C_{n11}$ may be indicated by $N_{n11}$.

Although the following embodiments are described using the number of contents as an example of content-related information to help for understanding, the categories may be updated using various pieces of content-related information (e.g., capacities of contents mapped to each category or proportion of one or more objects included in contents mapped to each category) as well as the number of contents according to various embodiments of the present disclosure as described above.

According to various embodiments of the present disclosure, when mapping of contents to be classified is completed, a process of re-mapping nodes, a process of updating a hierarchical category structure, or a process of re-classifying categories of contents may be performed in various embodiments described below. As described below, a method of re-mapping contents, a method of updating a hierarchical category structure, or a method of re-classifying categories of contents may be implemented in various ways, and implemented in consideration of deviation of distribution of contents to each category according to various embodiments of the present disclosure. According to various embodiments of the present disclosure, it is possible to reduce deviation of the number of contents mapped to each category by making the number of contents mapped to a category based on each node within a predetermined range. Further, according to various embodiments of the present disclosure, it is possible to reduce deviation of capacities of contents mapped to each category by making the total capacities of contents mapped to a category based on each node within a predetermined range. In addition, according to various embodiments of the present disclosure, it is possible to reduce deviation of proportions of objects included in contents mapped to each category by making the proportions of the objects included in the contents mapped to a category based on each node within a predetermined range.

Figure 4A:
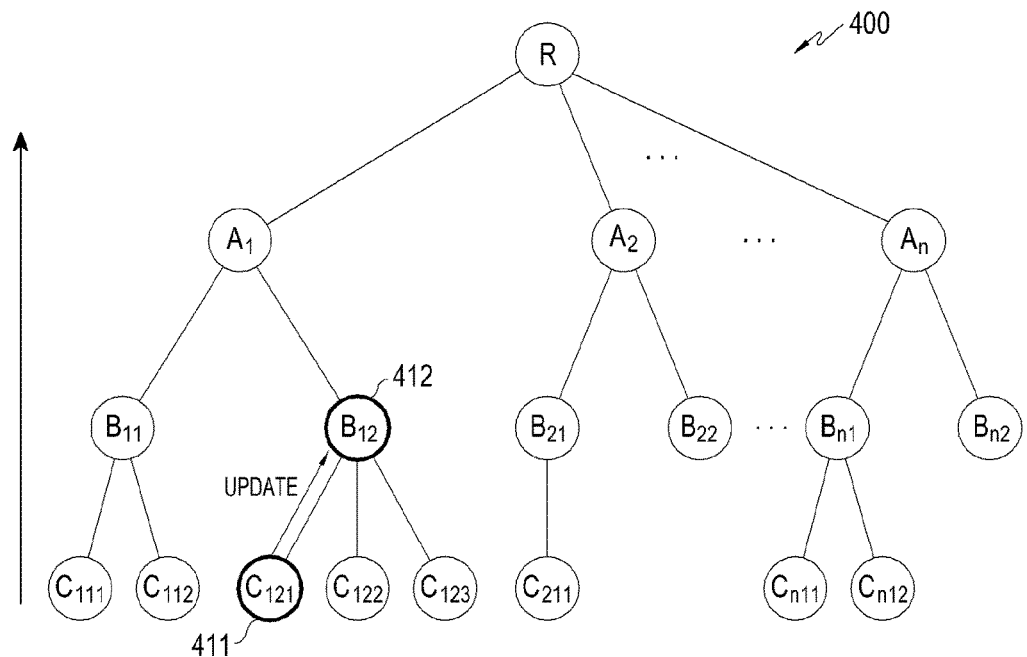
FIG. 4A illustrates an example of updating categories according to various embodiments of the present disclosure.
Figure 4B:
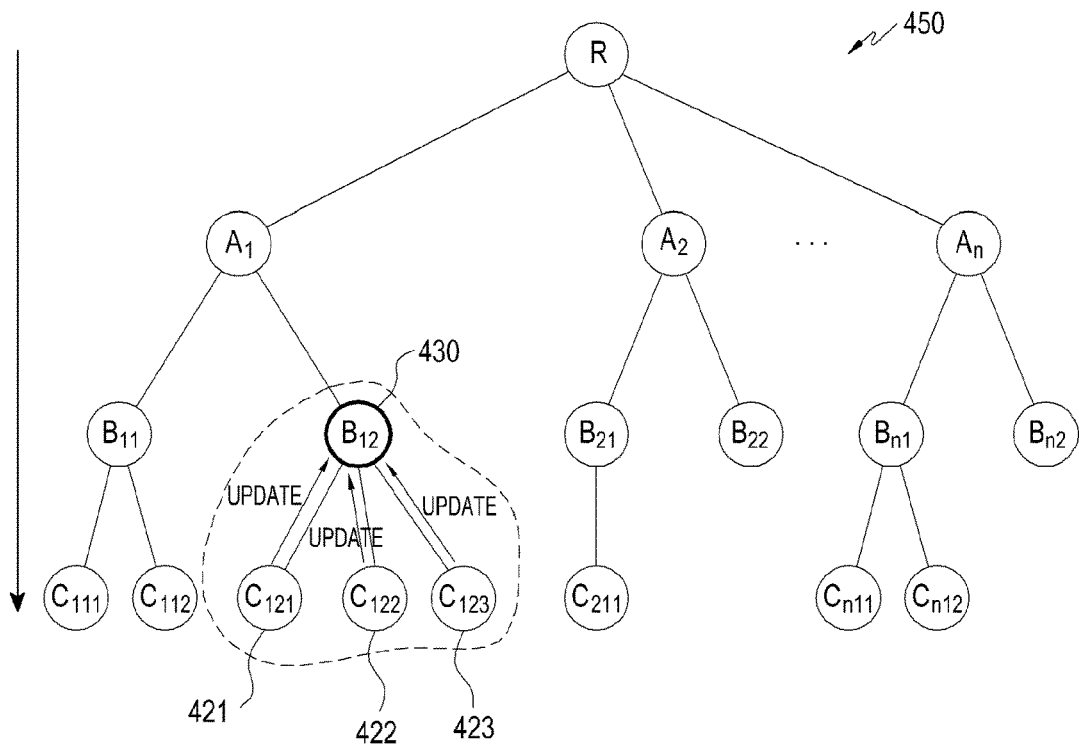
FIG. 4B illustrates an example of updating categories according to various embodiments of the present disclosure.

FIGS. 4A and 4B illustrate an example of updating categories according to various embodiments of the present disclosure.

FIG. 4A illustrates an example of re-mapping categories of contents or updating a hierarchical structure of the categories 400 according to various embodiments of the present disclosure. Referring to FIG. 4A, it is determined whether a number of contents mapped to categories of final nodes is greater than, less than, or equal to a preset number (e.g., 10, 20, 50, or 100) (in the following description, it is assumed that the preset number is 20 for convenience of the description, but various embodiments of the present disclosure are not limited thereto).

For example, it is determined whether a number of contents mapped to $C_{111}$, $C_{112}$, $C_{121}$, $C_{122}$, $C_{123}$, $C_{211}$, $B_{22}$, $C_{n11}$, $C_{n12}$, or $B_{n2}$ is greater than, less than, or equal to a preset number (e.g., 20). In the following embodiment, a method of re-mapping categories when a number of contents mapped to a particular category is less than a preset number will be described, but various embodiments of the present disclosure at not limited thereto. However, a method of re-mapping categories according to various conditions such as a case where the number of contents is greater than the preset number or is not equal to the preset number may be used. Further, although the following embodiment describes a method of determining the number of contents mapped to a particular category to re-mapping categories, various embodiments of the present disclosure are not limited thereto, and a method of re-mapping categories by determining capacities of contents mapped to each category and proportions of objects included in contents mapped to each category as well as the number of contents mapped to each category may be also used.

According to various embodiments of the present disclosure, as illustrated in FIG. 4A, when N corresponding to the number of contents mapped to third leaf node $C_{121}$ 411 is smaller than 20, the contents mapped to third leaf node $C_{121}$ 411 may be re-mapped to the higher node (second leaf node) $B_{12}$ 412 of $C_{121}$. A method of re-mapping the contents may be implemented in various ways.

For example, a category corresponding to the contents mapped to $C_{121}$ 411 may be updated into second leaf node $B_{12}$ 412 from third leaf node $C_{121}$ 411 (in order to implement this, content classification information may be updated). In another example, a category structure for displaying a content list may be additionally configured separately from category $C_{121}$ 411 corresponding to the contents mapped to $C_{121}$ 411, and the category for displaying the content list may be updated from $C_{121}$ 411 to $B_{12}$ 412 (in order to implement this, category information for displaying a content list may be added to content classification information to update the content classification information). In still another example, the node of $C_{121}$ 411 may be deleted from the hierarchical category structure 400, and the hierarchical category structure 400 may be changed such that $C_{121}$ 411 points to $B_{12}$ 412. Accordingly, the contents mapped to node $C_{121}$ 411 may be mapped to $B_{12}$.

The process of updating each node may continuously progress starting from the final node to a higher node. For example, the process may be performed until the number of contents corresponding to all nodes is greater than or equal to a preset number. However, since the first leaf nodes, such as A, $A_1$, . . . , $A_n$, have no higher leaf node, the process of updating is unnecessary (even when the number of mapped contents is greater than or equal to a preset number). Further, according to various embodiments of the present disclosure, the processes of updating the nodes may be continuously performed until another condition as well as the preset number is met. In addition, according to various embodiments of the present disclosure, the process of updating the nodes may be performed only for the final node, only from the final node to a node in which an initial update starts, or only from the final node to a node in which the preset number of updates is made.

FIG. 4B illustrates an example of re-mapping categories of contents or updating a hierarchical structure of the categories 450 according to various embodiments of the present disclosure. Referring to FIG. 4B, a process of updating each node may be performed from a higher node to a lower node.

For example, as illustrated in FIG. 4B, according to various embodiments, when the number of contents mapped to one or more lower nodes connected to a particular node is less than a preset number, the content mapped to the lower nodes may be updated to the corresponding node.

More specifically, it is identified whether a value generated by adding numbers of contents mapped to lower nodes (e.g., $B_{11}$, $C_{111}$, $C_{112}$, $B_{12}$, $C_{121}$, $C_{122}$, and $C_{123}$) of the first leaf node $A_1$ is less than a preset number. When the number of contents mapped to the lower nodes is greater than or equal to the preset number, the process goes to another node. When the number of contents mapped to the lower nodes is less than the preset number, the contents mapped to the lower nodes may be re-mapped to corresponding nodes.

When the process is completed for all the first leaf nodes, the same process may be performed for second leaf nodes.

For example, the second leaf nodes identify whether the number of contents mapped to third leaf nodes to N leaf nodes connected to the second leaf nodes is greater than or equal to a preset number.

Referring to FIG. 4B, a sum $(N_{121}+N_{122}+N_{123})$ of numbers of contents mapped to lower nodes (third leaf nodes) $C_{121}$ 421, $C_{122}$ 422, and $C_{123}$ 423 connected to second leaf node $B_{12}$ 430 is less than a preset number (e.g., 20), the contents mapped to third leaf nodes $C_{121}$ 421, $C_{122}$ 422, and $C_{123}$ 423 may be re-mapped to second leaf node $B_{12}$ 430. Accordingly, at least one category may include a number of contents greater than or equal to the preset number (e.g., 20) of contents. As described above, when the second leaf nodes have been completely inspected, the same process may be performed for the third leaf nodes. Further, according to various embodiments of the present disclosure, the processes of updating the nodes may be continuously performed until another condition as well as the preset number is met. In addition, according to various embodiments of the present disclosure, the process of updating the nodes may be performed only for the highest node, only from the highest node to a node in which an initial update starts, or until a node that meets the condition is not found any more.

Figure 5:
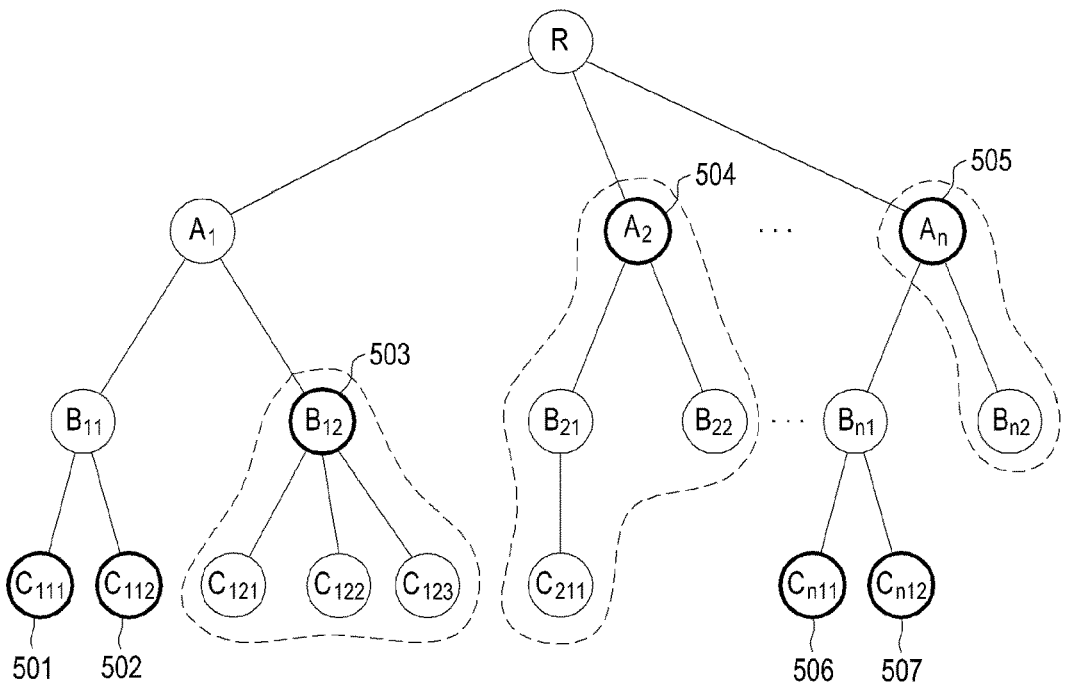
FIG. 5 illustrates a type of category update according to various embodiments of the present disclosure.
Figure 6:
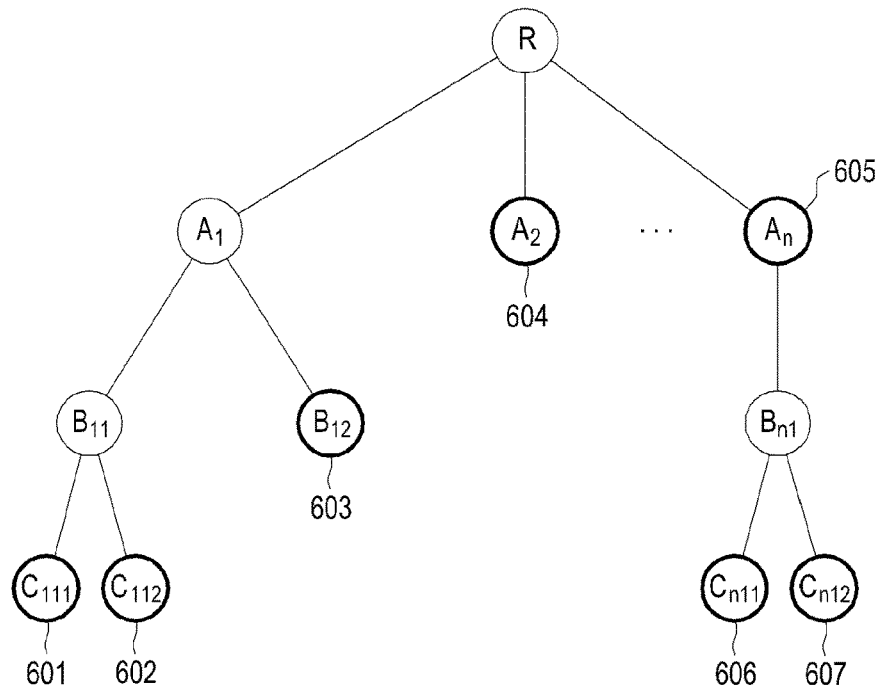
FIG. 6 illustrates a result of category update according to various embodiments of the present disclosure.

FIGS. 5 and 6 illustrate a result of inspecting the number of contents according to each node and re-mapping the contents according to various embodiments of the present disclosure. Referring to FIG. 5, since the number of contents mapped to $C_{111}$ 501 and $C_{112}$ 502 is greater than or equal to a preset number, the contents are not re-mapped or updated. However, since the number of contents mapped to $C_{121}$, $C_{122}$, and $C_{123}$ is less than the preset number, the content may be re-mapped to $B_{12}$ 503. In a case of $A_2$ node 504, $B_{21}$, $B_{22}$, and $C_{211}$ nodes may be re-mapped to $A_2$ node 504 through two mappings in lower nodes. In a case of lower nodes of $A_n$ 505, the preset number or more of contents are mapped to each of $C_{n11}$ 506 and $C_{n11}$ 507, so re-mapping is not performed, but the number of contents mapped to $B_{n2}$ is less than a preset number and thus the contents are re-mapped to $A_n$ 505 even though $B_{n2}$ corresponds to the second leaf node.

According to various embodiments, as illustrated in FIG. 5, a mapping node of contents mapped to each node may be updated or a mapped category may be changed to a higher node. Further, as described above, according to various embodiments, the hierarchical category structure may be updated as illustrated in FIG. 6.

Referring to FIG. 6, in the initial structure of categories illustrated in FIG. 3, some lower nodes may be merged into a higher node according to various embodiments. Accordingly, only categories corresponding to nodes (e.g., $C_{111}$ 601, $C_{112}$ 602, $B_{12}$ 603, $A_2$ 604, $A_n$ 605, $C_{n11}$ 606, and $C_{n12}$ 607) marked in bold in FIG. 6 may be displayed. The nodes marked in bold correspond to nodes merged according to the number of mapped contents, which result in reducing the number of nodes in comparison with the number of nodes in FIG. 3 and also uniformly distributing the number of contents mapped to the nodes.

FIGS. 3 to 6 have described the method of updating the nodes or updating the categories of the contents according to two embodiments. However, each of the methods can be modified according to various embodiments, and a new method can be implemented by combining the two embodiments in various ways.

Figure 7:
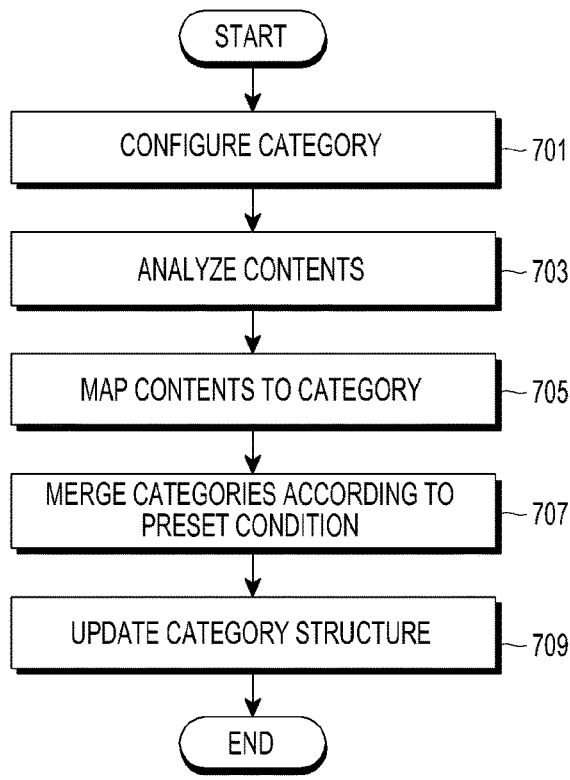
FIG. 7 is a flowchart illustrating a content classification process according to various embodiments of the present disclosure.

FIG. 7 is a flowchart illustrating a content classification process according to various embodiments of the present disclosure. Referring to FIG. 7, categories may be configured in a hierarchical structure in operation 701. Contents to be mapped to the categories may be analyzed in operation 703, and each of the contents may be mapped to the category according to the analysis in operation 705.

According to various embodiments, when content-related information on contents mapped to each category is identified and the identified content-related information meets a preset condition in operation 707, the categories may be merged or re-classified according to the preset condition. In operation 709, a total category structure may be updated according to the merger or re-classification of the categories.

Figure 8:
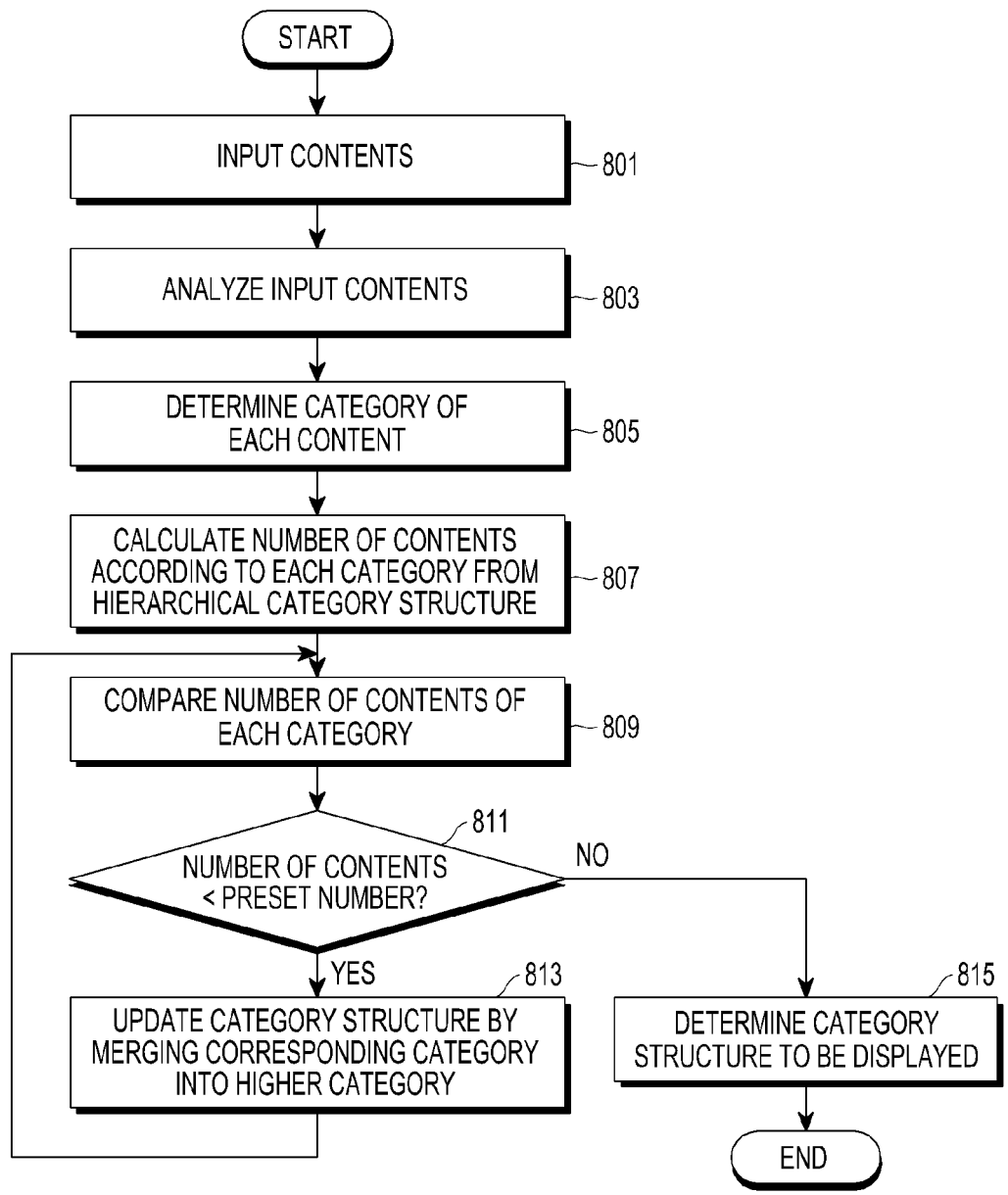
FIG. 8 is a flowchart illustrating a content classification process according to various embodiments of the present disclosure.
Figure 9:
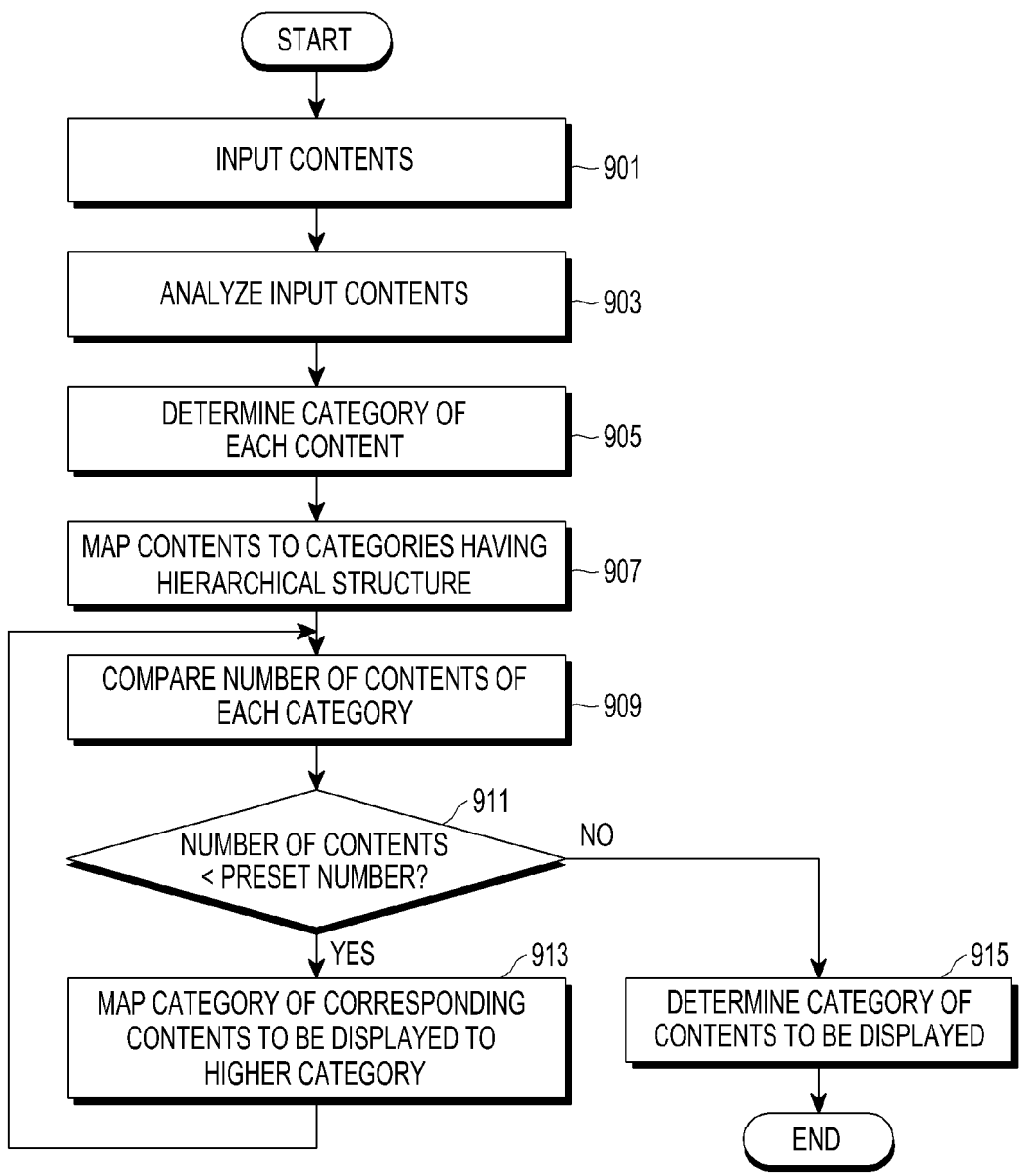
FIG. 9 is a flowchart illustrating a content classification process according to various embodiments of the present disclosure.

FIGS. 8 and 9 are flowcharts illustrating a content classification process according to various embodiments of the present disclosure. Referring to FIG. 8, when contents are input in operation 801 and the input contents are analyzed in operation 803, a category of each of the contents may be determined according to the analysis in operation 805. In operation 803, the input of the contents can be implemented in various ways. For example, according to various embodiments of the present disclosure, contents pre-stored in a memory (e.g., the memory 130 of FIG. 1) of an electronic device (e.g., the electronic device 101 of FIG. 1) may be input and analyzed, contents (e.g., photographed pictures or images) directly generated by the electronic device may be stored and then analyzed, or contents downloaded from an external server (e.g., the server 106 of FIG. 1) may be stored in the memory and then analyzed. In operation 807, the number of corresponding contents according to each category may be calculated from the contents of which categories are determined from the configured hierarchical category structure. The number of contents corresponding to each category is compared in operation 809. When the number of contents is less than a preset number in operation 811, the category structure may be updated by merging the corresponding category with a higher category in operation 813. When the process of comparing the number of contents of each category has been completely performed for all categories, the category structure may be finally determined in operation 815.

According to various embodiments, the comparison process of categories may be performed for all the categories or only some of the categories. Further, according to various embodiments of the present disclosure, although the number of contents mapped to each category is used as a condition of updating the category structure in FIG. 8, capacities of contents or a proportion of a particular object within contents as well as the number of contents may be used as the condition. In addition, although it has been described that the update is performed when the number of contents mapped to each category is less than the preset number as an example, the update may be performed when the number of contents is greater than the preset number, when the number of contents is equal to the preset number, or the number of contents is not equal to the preset number according to various embodiments of the present disclosure.

According to various embodiments, when categories of contents are predetermined or contents and mapped category information are received and stored together, operations 801 to 805 may be omitted in FIG. 8. According to various embodiments, instead of operations 801 to 805, the category may be determined by transmitting contents to a server (e.g., the server 106 of FIG. 1) and making a request for analyzing the contents, and receiving an analysis result of the contents from the server.

According to various embodiments of the present disclosure, the preset number compared with the number of contents of each category may be determined in various ways. For example, at least one configured number (e.g., 10, 20, 50, or 100) may be applied to at least one category. For example, the preset number is configured to be small with respect to a category (e.g., a category which the user relatively more frequently accesses) in which the user is more interested, or the corresponding category may be configured to not be merged with a higher category regardless of the number of contents.

According to various embodiments of the present disclosure, the preset number may be configured in proportion to the total number of contents. For example, when the total number of contents ranges from 1000 to 2000, the preset number may be configured as 20. When the total number of contents ranges from 2000 to 3000, the preset number may be configured as 30.

According to various embodiments of the present disclosure, the preset number may be configured in consideration of the total number of contents. For example, when the total number of contents is 30, the preset number may be configured as 30. When the total number of contents is 50, the preset number may be controlled to 40 or 50 to reduce the total number of categories.

According to various embodiments of the present disclosure, by assigning a weighted value to a category (e.g., a folder) which the user frequently checks (e.g., accesses), a field in which the user is highly interested may be more subdivided.

According to various embodiments of the present disclosure, although the number of contents mapped to each category has been compared to update the category structure in FIG. 8, various conditions may also be applied to update the category structure as described above. For example, according to various embodiments, not only the number of contents mapped to each category, but also capacities of contents mapped to each category or a proportion of at least one object included in the contents mapped to each category may be compared with the preset condition to update the category structure.

FIG. 9 is a flowchart illustrating a category configuration process for content classification according to another embodiment of the present disclosure. Referring to FIG. 9, when contents are input in operation 901 and the input contents are analyzed in operation 903, a category of each of the contents may be determined according to the analysis in operation 905. In operation 903, the input of the contents can be implemented in various ways. For example, according to various embodiments of the present disclosure, contents pre-stored in a memory (e.g., the memory 130 of FIG. 1) of an electronic device (e.g., the electronic device 101 of FIG. 1) may be input and analyzed, contents (e.g., photographed pictures or images) directly generated by the electronic device may be stored and then analyzed, or contents downloaded from an external server (e.g., the server 106 of FIG. 1) may be stored in the memory and then analyzed.

In operation 907, each of the contents may be mapped to each node (category) in the hierarchical structure according to the determined category.

The number of contents corresponding to each category is compared in operation 909. When the number of contents is less than a preset number in operation 911, the determined category may be updated by re-mapping the category of the corresponding contents to be displayed to a higher category connected to the current category in operation 913. When the process of comparing the number of contents of each category has been completely performed for all categories, the category of the contents to be displayed may be finally determined in operation 915.

Further, according to various embodiments of the present disclosure, although the number of contents mapped to each category is used as a condition of updating the category structure in FIG. 9, capacities of contents or a proportion of a particular object within contents as well as the number of contents may be used as the condition. In addition, although it has been described that the update is performed when the number of contents mapped to each category is less than the preset number as an example, the update may be performed when the number of contents is greater than the preset number, when the number of contents is equal to the preset number, or the number of contents is not equal to the preset number according to various embodiments of the present disclosure.

A method of operating an electronic device according to various embodiments of the present disclosure may comprise: configuring one or more categories in a hierarchical structure; mapping one or more contents and the one or more categories based on at least one piece of information on the one or more contents and information on the categories; and when content-related information of each category determined according to the mapping meets a preset condition, updating the hierarchical structure of the categories based on the preset condition.

According to various embodiments of the present disclosure, the method may further include displaying lists of the one or more contents based on the updated hierarchical structure of the categories.

According to various embodiments of the present disclosure, the content-related information of each category is at least one selected from a number of contents mapped to each category, capacities of contents mapped to each category, and proportions of one or more objects included in the contents mapped to each category.

According to various embodiments of the present disclosure, the preset condition may be at least one selected from a condition in which a number of contents mapped to each category is different from a preset number, a condition in which the number of contents mapped to each category is greater than the preset number, a condition in which the number of contents mapped to each category is less than the preset number, a condition in which capacities of contents mapped to each category are larger than preset capacities, a condition in which the capacities of the contents mapped to each category are smaller than the preset capacities, a condition in which proportions of one or more objects included in the contents mapped to each category are greater than preset proportions, and a condition in which the proportions of the one or more objects included in the contents mapped to each category are less than the preset proportions.

According to various embodiments of the present disclosure, the preset number may vary depending on each of the one or more categories.

According to various embodiments of the present disclosure, the preset number may be configured based on a total number of contents mapped to the one or more categories.

According to various embodiments of the present disclosure, the preset number may be configured based on the number of one or more categories.

According to various embodiments of the present disclosure, the preset number may be configured based on a number of user accesses to the one or more categories.

According to various embodiments of the present disclosure, the method may further include: analyzing the one or more contents; and identifying categories of the contents based on a result of the analysis.

According to various embodiments of the present disclosure, the method may further include: receiving analysis information on one or more contents from a second electronic device; and identifying categories of the contents based on a result of the analysis.

According to various embodiments of the present disclosure, the method may further include: transmitting one or more contents to the second electronic device; and receiving analysis information on the transmitted contents from the second electronic device.

According to various embodiments of the present disclosure, the method may further include receiving the one or more contents and analysis information on the one or more contents from the second electronic device.

According to various embodiments of the present disclosure, the updating of the hierarchical structure of the categories may include merging the category into a higher category in the hierarchical structure.

According to various embodiments of the present disclosure, the updating of the hierarchical structure of the categories may include classifying the category into one or more lower categories in the hierarchical structure.

Figure 10:
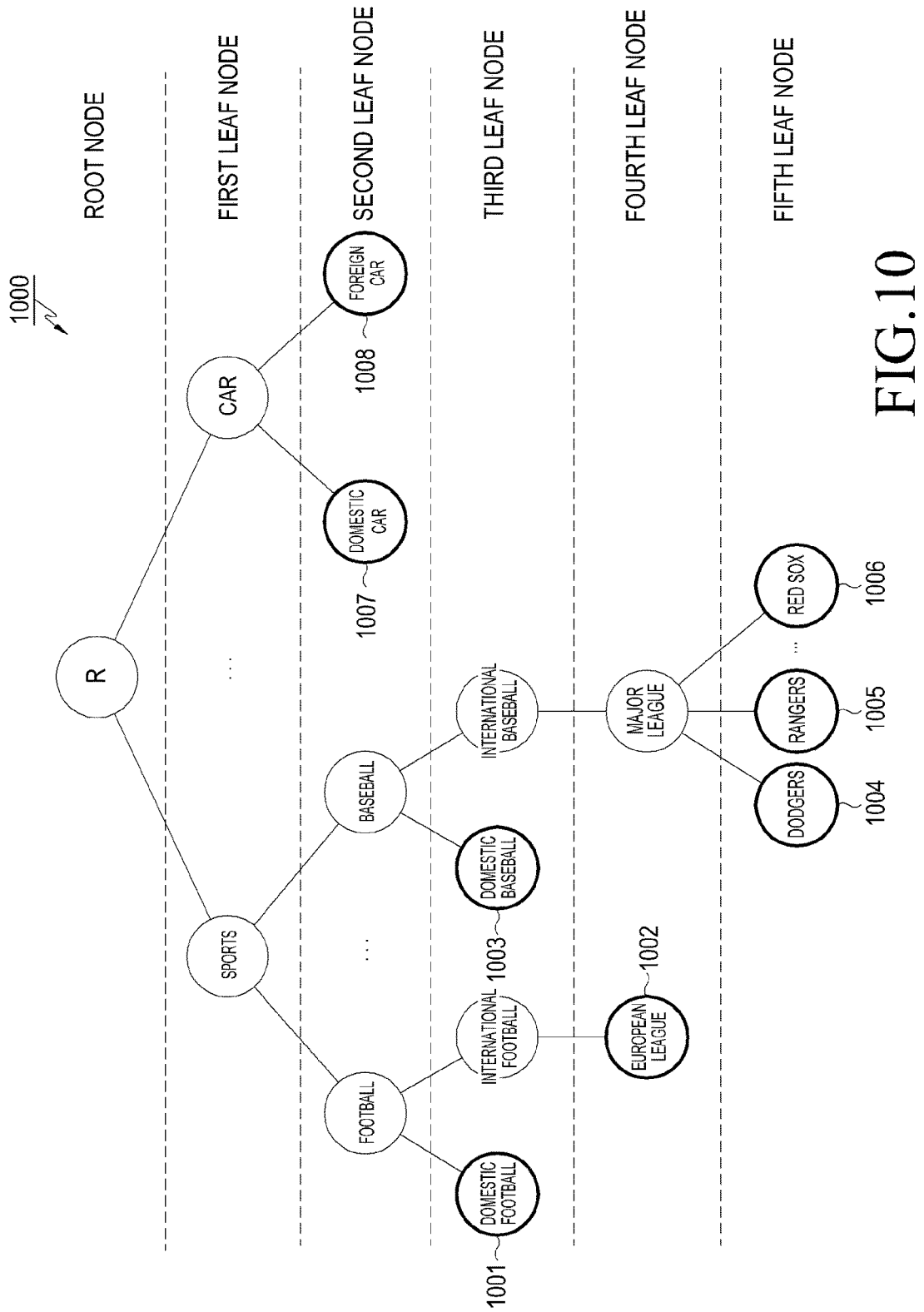
FIG. 10 illustrates a result of category update according to various embodiments of the present disclosure.

FIG. 10 illustrates a result of category update in the form of a category tree 1000 according to various embodiments of the present disclosure. Referring to FIG. 10, categories for content classification may be configured in a hierarchical structure. For example, categories such as sports or cars may be configured as first leaf nodes below a root node, and categories such as football and baseball may be configured as second leaf nodes below the sports nodes. In the same way, lower categories of each category may be configured up to fifth leaf nodes.

FIG. 10 illustrates a view in which the category update has been completed through the processes in FIGS. 4 to 6, and corresponds to FIG. 7. As illustrated in FIG. 10, lower nodes are merged according to the number of contents based on each node, so that depths to the lower nodes may be differently reconfigured according to each node.

Based on FIG. 10, it is noted that a user is more interested in sports rather than cars, baseball rather than football, and the Major League® rather than domestic baseball through analysis of categories of possessed contents. For example, a relatively large number of contents corresponding to a particular category may mean great interest in the corresponding category.

Accordingly, it is possible to reduce deviation of the number of contents according to each category by reconfiguring a hierarchical category structure as illustrated in FIG. 10 through the embodiment of the present disclosure, and to further subdivide and display the category in the field in which the user is interested.

In FIG. 10, only categories corresponding to nodes (e.g., domestic football 1001, European league 1002, domestic baseball 1003, Dodgers® 1004, Rangers® 1005, Red Sox® 1006, domestic car 1007, foreign car 1008 and the like) displayed in bold may be displayed. The nodes marked in bold correspond to nodes merged according to the number of mapped contents, which result in reducing the number of nodes in comparison and also uniformly distributing the number of contents mapped to the nodes.

Figure 11A:
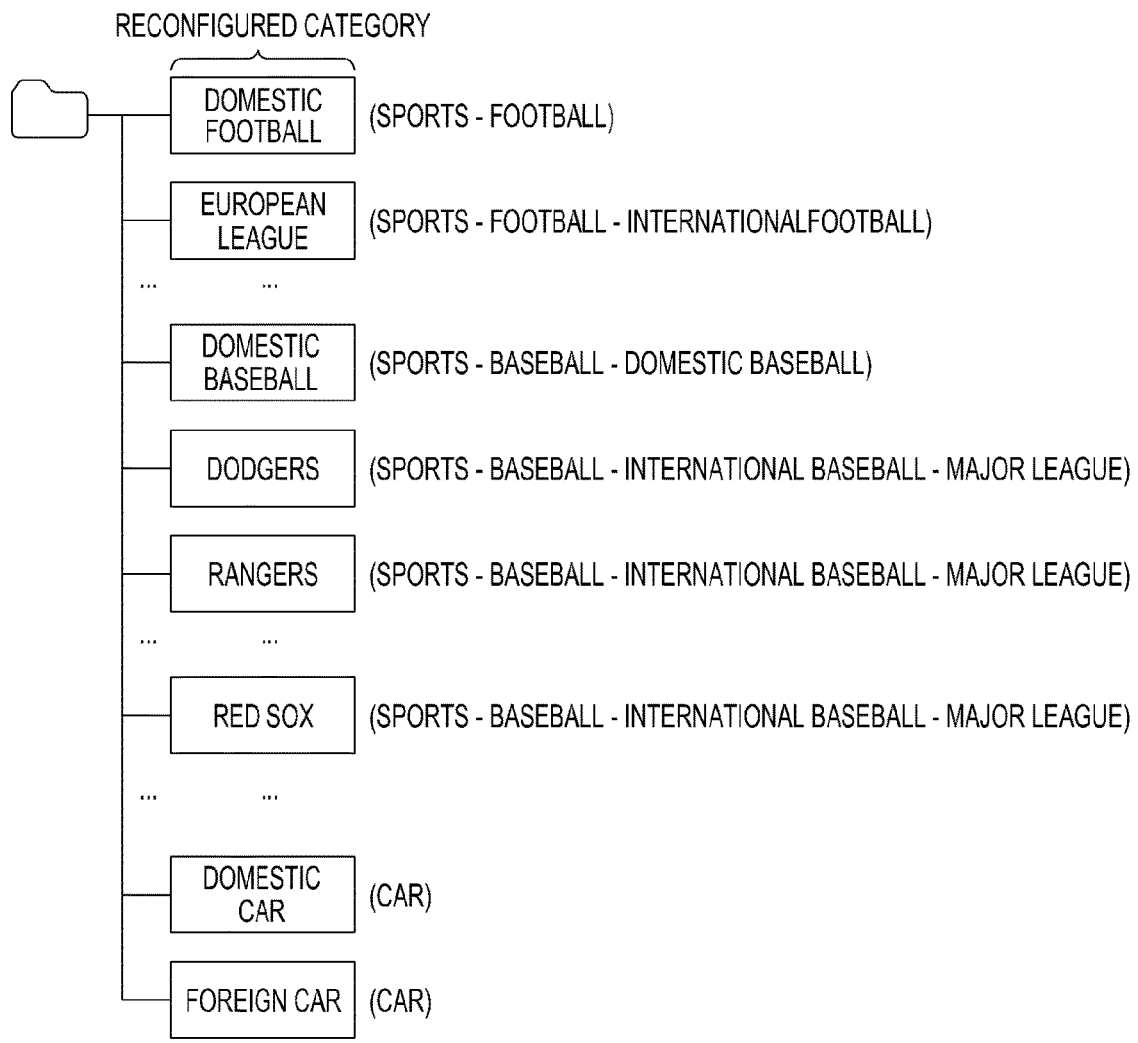
FIG. 11A illustrates embodiments of methods of displaying a folder by category update according to various embodiments of the present disclosure.
Figure 11B:
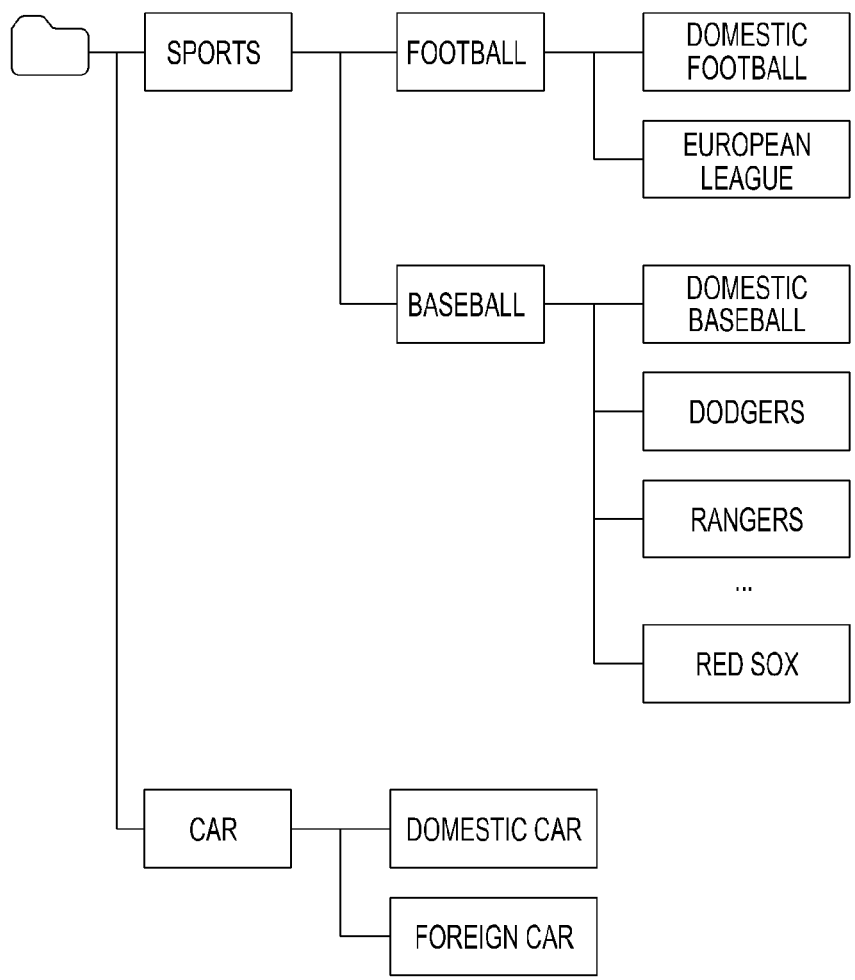
FIG. 11B illustrates embodiments of methods of displaying a folder by category update according to various embodiments of the present disclosure.

FIGS. 11A and 11B illustrate embodiments of methods of displaying a folder by category update according to various embodiments of the present disclosure. Referring to FIGS. 11A and 11B, with respect to a football, contents corresponding to domestic football and a European league may be included and displayed in one category (e.g., folder), respectively. With respect to an international baseball, categories may be classified and displayed according to each Major League® team. Further, with respect to a car, a domestic car and a foreign car may be included and displayed in one category, respectively.

According to various embodiments of the present disclosure, re-classified categories may be displayed such that final categories are arranged in parallel as illustrated in FIG. 11A and such that categories are merged in the hierarchical structure as illustrated in FIG. 11B.

Figure 12:
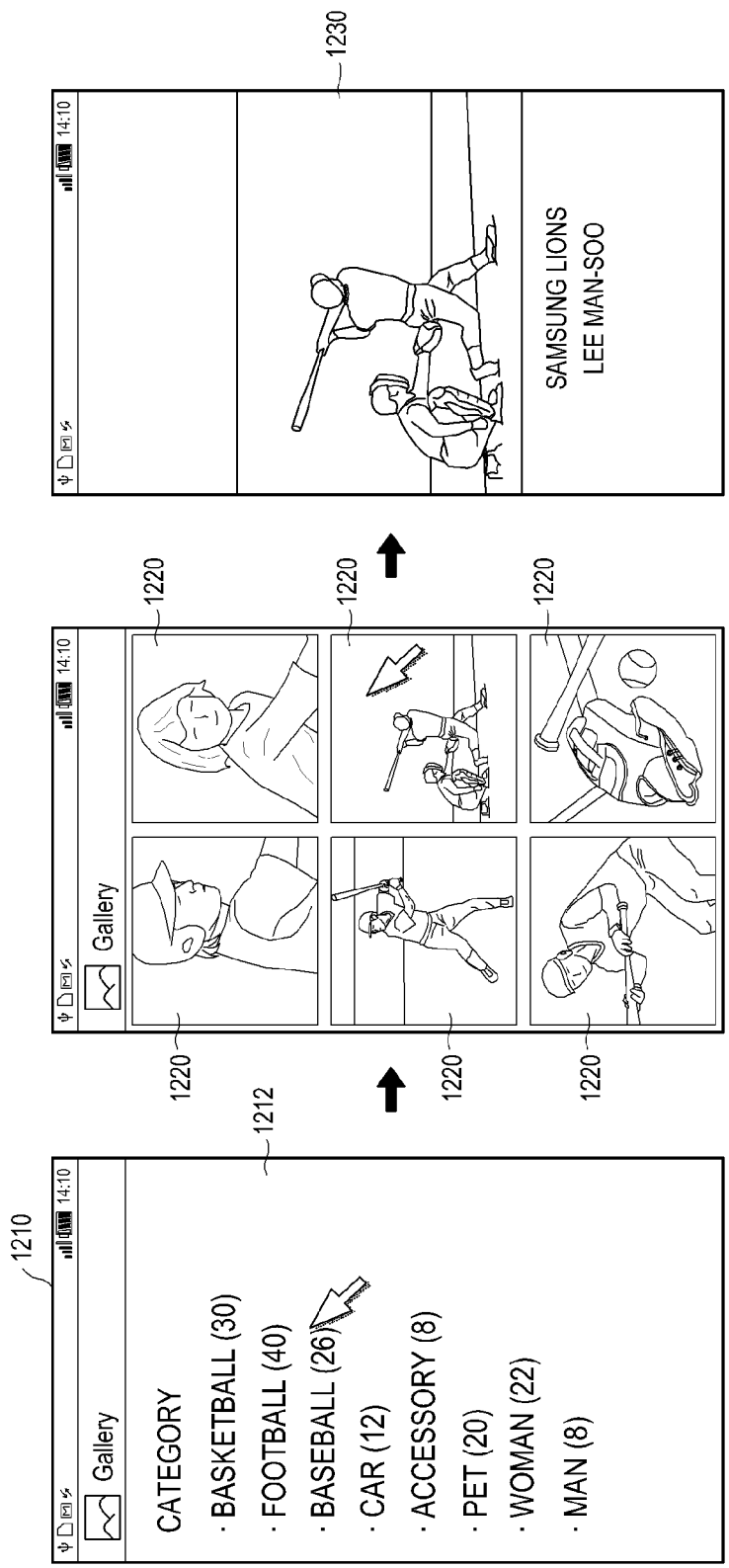
FIG. 12 illustrates a display method by category update in a gallery according to various embodiments of the present disclosure.

FIG. 12 illustrates a display method by category update in a gallery according to various embodiments of the present disclosure. Referring to FIG. 12, when the user executes a gallery application 1210 in an electronic device (e.g., the electronic device 101) and configures arrangement of folders to be displayed as customized categories according to various embodiments, re-classified categories 1212 may be displayed in consideration of contents mapped to each category as described above. When each of the re-classified categories is selected, a list of contents mapped to the corresponding categories may be displayed in the form of preview 1220. When particular contents are selected, the selected contents may be displayed on an entire screen 1230.

For example, according to various embodiments of the present disclosure, when the user has large interest or the number of pictures stored in a particular category is large, the corresponding category may be more subdivided into relatively lower categories and displayed.

Figure 13:
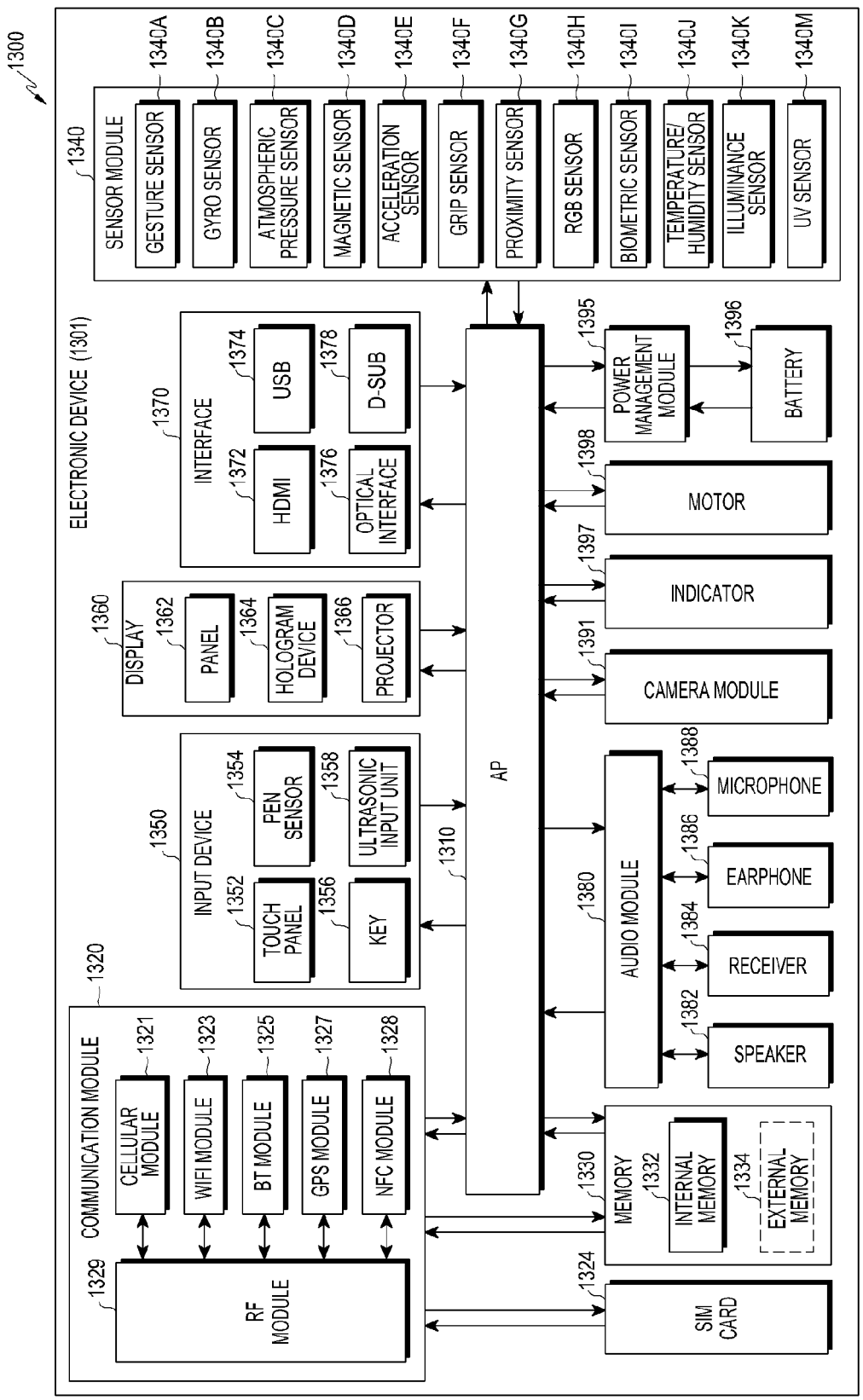
FIG. 13 is a block diagram illustrating a detailed configuration of an electronic device according to various embodiments of the present disclosure.

FIG. 13 illustrates a block diagram 1300 of an electronic device 1301 according to various embodiments. The electronic device 1301 may constitute, for example, all or some of the electronic device 101 illustrated in FIG. 1. Referring to FIG. 13, the electronic device 1301 may include at least one of an Application Processor (AP) 1310, a communication module 1320, a Subscriber Identifier Module (SIM) card 1324, a memory 1330, a sensor module 1340, an input device 1350, a display 1360, an interface 1370, an audio module 1380, a camera module 1391, a power management module 1395, a battery 1396, an indicator 1397, and a motor 1398.

The AP 1310 may control a plurality of hardware or software components connected thereto by driving an operating system or an application program, process various types of data including multimedia data, and perform calculations. The AP 1310 may be implemented by, for example, a System on Chip (SoC). According to an embodiment, the AP 1310 may further include a Graphic Processing Unit (GPU) (not shown).

The communication module 1320 (e.g., the communication interface 130 of FIG. 1) may perform data transmission/reception in communication between the electronic device 1301 (e.g., the electronic device 101 of FIG. 1) and the second electronic devices (e.g., the electronic device 104 and the server 106) connected over a network. According to an embodiment, the communication module 1320 may include a cellular module 1321, a WiFi module 1323, a BT module 1325, a GPS module 1327, an NFC module 1328, and a Radio Frequency (RF) module 1329.

The cellular module 1321 may provide a voice call, a video call, a message service, or an internet service through a communication network (e.g., LTE, LTE-A, CDMA, WCDMA, UMTS, WiBro, GSM, or the like). Also, the cellular module 1321 may identify and authenticate the electronic device 1301 in a communication network using, for example, a subscriber identification module (e.g., the SIM card 1324). According to an embodiment, the cellular module 1321 may perform at least some of the functions that may be provided by the AP 1310. For example, the cellular module 1321 may perform at least some of the multimedia control functions.

According to an embodiment, the cellular module 1321 may include a Communication Processor (CP). In addition, the cellular module 1321 may be implemented by, for example, a System on Chip (SOC). Although the cellular module 1321 (e.g., a communication processor), the memory 1330, the power management module 1395, and the like are illustrated as components separated from the AP 1310, the AP 1310 may include at least some of the above-mentioned components (e.g., the cellular module 1321) according to an embodiment.

According to an embodiment, the AP 1310 or the cellular module 1321 (e.g., the communication processor) may load a command or data received from at least one of a non-volatile memory and other elements connected thereto into a volatile memory and process the loaded command or data. Furthermore, the AP 1310 or the cellular module 1321 may store, in a non-volatile memory, data received from or generated by at least one of the other components.

Each of the Wi-Fi module 1323, the BT module 1325, the GPS module 1327, or the NFC module 1328 may include, for example, a processor for processing data transmitted/received through the corresponding module. Although each of the cellular module 1321, the WiFi module 1323, the BT module 1325, the GPS module 1327, and the NFC module 1328 is illustrated as a separate block in FIG. 13, at least some (e.g., two or more) of the cellular module 1321, the WiFi module 1323, the BT module 1325, the GPS module 1327, and the NFC module 1328 may be included in one integrated chip (IC) or IC package according to an embodiment. For example, at least a few (e.g., a communication processor corresponding to the cellular module 1321 and a Wi-Fi processor corresponding to the Wi-Fi module 1323) of the processors corresponding to the cellular module 1321, the Wi-Fi module 1323, the BT module 1325, the GPS module 1327, and the NFC module 1328, respectively, may be implemented by a single SoC.

The RF module 1329 may transmit/receive data, for example, an RF signal. Although not illustrated, the RF module 1329 may include, for example, a transceiver, a Power Amp Module (PAM), a frequency filter, or a Low Noise Amplifier (LNA). Further, the RF module 1329 may further include a component for transmitting/receiving an electromagnetic wave in the air in radio communication, such as a conductor or a conducting wire. Although FIG. 13 illustrates that the cellular module 1321, the WiFi module 1323, the BT module 1325, the GPS module 1327, and the NFC module 1327 share one RF module 1329, at least one of the cellular module 1321, the WiFi module 1323, the BT module 1325, the GPS module 1327, and the NFC module 1328 may transmit/receive an RF signal through a separate RF module.

The SIM card 1324 may be a card including a subscriber identification module and may be inserted into a slot formed in a particular portion of the electronic device 1301. The SIM card 1324 may include unique identification information (e.g., Integrated Circuit Card IDentifier (ICCID)) or subscriber information (e.g., International Mobile Subscriber Identity (IMSI)).

The memory 1330 (e.g., the memory 130 of FIG. 1) may include an internal memory 1332 or an external memory 1334. The internal memory 1332 may include at least one of a volatile memory (e.g., a Dynamic Random Access Memory (DRAM), a Static Random Access Memory (SRAM), a Synchronous Dynamic Random Access Memory (SDRAM), and the like) and a non-volatile memory (e.g., a One Time Programmable Read Only Memory (OTPROM), a Programmable Read Only Memory (PROM), an Erasable and Programmable Read Only Memory (EPROM), an Electrically Erasable and Programmable Read Only Memory (EEPROM), a mask Read Only Memory, a flash Read Only Memory, a negative-AND (NAND) flash memory, a negative-OR (NOR) flash memory, and the like).

According to an embodiment, the internal memory 1332 may be a Solid State Drive (SSD). The external memory 1334 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, or the like. The external memory 1334 may be functionally connected to the electronic device 1301 through various interfaces. According to an embodiment, the electronic device 1301 may further include a storage device (or storage medium) such as a hard drive.

The sensor module 1340 may measure a physical quantity or detect an operating state of the electronic device 1301 and convert the measured or detected information into an electrical signal. The sensor module 1340 may include, for example, at least one of a gesture sensor 1340A, a gyro sensor 1340B, an atmospheric pressure sensor 1340C, a magnetic sensor 1340D, an acceleration sensor 1340E, a grip sensor 1340F, a proximity sensor 1340G, a color sensor 1340H (e.g., a Red, Green, Blue (RGB) sensor), a biometric sensor 1340I, a temperature/humidity sensor 1340J, a light or illuminance sensor 1340K, and an ultraviolet (UV) sensor 1340M. Additionally or alternatively, the sensor module 1340 may include, for example, an E-nose sensor (not illustrated), an Electromyography (EMG) sensor (not illustrated), an Electroencephalogram (EEG) sensor (not illustrated), an Electrocardiogram (ECG) sensor (not illustrated), an Infrared (IR) sensor, an iris sensor (not illustrated), or a fingerprint sensor (not illustrated). The sensor module 1340 may further include a control circuit for controlling at least one sensor included therein.

The input device 1350 may include a touch panel 1352, a (digital) pen sensor 1354, a key 1356, or an ultrasonic input device 1358. The touch panel 1352 may recognize a touch input through at least one of, for example, a capacitive type, a resistive type, an infrared type, and an ultrasonic type. The touch panel 1352 may further include a control circuit. A capacitive type touch panel may recognize physical contact or proximity. The touch panel 1352 may further include a tactile layer. In this case, the touch panel 1352 may provide a tactile reaction to a user.

The (digital) pen sensor 1354 may be implemented, for example, using the same or similar method to receiving a user's touch input or using a separate recognition sheet. The key 1356 may include, for example, a physical button, an optical key or a keypad. The ultrasonic input device 1358 is a device which can detect an acoustic wave by a microphone (e.g., a microphone 1388) of the electronic device 1301 through an input tool generating an ultrasonic signal to identify data, and can perform wireless recognition. According to an embodiment, the electronic device 1301 may also receive a user input from a second electronic device (e.g., a computer or a server, e.g., the server 106 of FIG. 1) connected thereto by using the communication module 1320.

The display 1360 (e.g., the display 150 of FIG. 1) may include a panel 1362, a hologram device 1364, or a projector 1366. The panel 1362 may be, for example, a Liquid Crystal Display (LCD), Active-Matrix Organic Light Emitting Diode (AM-OLED), or the like. The panel 1362 may be implemented to be, for example, flexible, transparent, or wearable. The panel 1362 may also be configured as one module together with the touch panel 1352. The hologram device 1364 may show a stereoscopic image in the air using interference of light. The projector 1366 may project light onto a screen to display an image. For example, the screen may be located inside or outside the electronic device 1301. According to an embodiment, the display 1360 may further include a control circuit for controlling the panel 1362, the hologram unit 1364, or the projector 1366.

The interface 1370 may include, for example, a High-Definition Multimedia Interface (HDMI) 1372, a Universal Serial Bus (USB) 1374, an optical interface 1376, or a D-subminiature (D-sub) 1378. The interface 1370 may be included in, for example, the communication interface 130 illustrated in FIG. 1. Additionally or alternatively, the interface 1370 may include, for example, a Mobile High-definition Link (MHL) interface, a Secure Digital (SD) card/Multi-Media Card (MMC) interface, or an Infrared Data Association (IrDA) standard interface.

The audio module 1380 may bilaterally convert a sound and an electrical signal. At least some components of the audio module 1380 may be included in, for example, the input/output interface 140 illustrated in FIG. 1. The audio module 1380 may process voice information input or output through, for example, a speaker 1382, a receiver 1384, earphones 1386, or the microphone 1388.

The camera module 1391 is a device that may photograph still and moving images, and according to an embodiment, may include one or more image sensors (e.g., a front sensor or a rear sensor), a lens (not shown), an Image Signal Processor (ISP) (not shown), or a flash (e.g., an LED or a xenon lamp, not shown).

The power management module 1395 may manage electric power of the electronic device 1301. Although not illustrated, the power management module 1395 may include, for example, a Power Management Integrated Circuit (PMIC), a charger Integrated Circuit (IC), or a battery or fuel gauge.

The PMIC may be mounted, for example, in integrated circuits or SoC semiconductors. The charging methods may be classified into wired charging and wireless charging. The charger IC may charge a battery and may prevent an overvoltage or excess current from being induced or flowing from a charger. According to an embodiment, the charger IC may include a charger IC for at least one of the wired charging and the wireless charging. Examples of the wireless charging may include magnetic resonance charging, magnetic induction charging, and electromagnetic charging, and an additional circuit such as a coil loop, a resonance circuit, and a rectifier may be added for the wireless charging.

The battery gauge may measure, for example, the remaining amount of battery, a charging voltage and current, or temperature. The battery 1396 may store or generate electricity and supply power to the electronic device 1301 using the stored or generated electricity. The battery 1396 may include, for example, a rechargeable battery or a solar battery.

The indicator 1397 may display a particular state of the electronic device 1301 or a part thereof (e.g., the AP 1310), for example, a boot-up state, a message state, a charging state, or the like. The motor 1398 may convert an electrical signal into mechanical vibration. Although not illustrated, the electronic device 1301 may include a processing unit (e.g., a GPU) for supporting mobile TV. The processing device for supporting mobile TV may process media data according to standards such as, for example, a digital multimedia broadcasting (DMB), a digital video broadcasting (DVB) or a media flow.

Each of the above described elements of the electronic device 101, or 1301, according to various embodiments of the present disclosure may be formed of one or more components, and the name of a corresponding element may vary according to the type of the electronic device 101, or 1301. The electronic device 101, or 1301, according to various embodiments of the present disclosure may include at least one of the above described elements and may exclude some of the elements or further include other additional elements. Further, some of the elements of the electronic device 101, or 1301, according to various embodiments of the present disclosure may be coupled to form a single entity while performing the same functions as those of the corresponding elements before the coupling.

At least some of the devices (e.g., modules or functions thereof) or methods (e.g., operations) according to various embodiments of the present disclosure may be implemented by, for example, by a command stored in a computer-readable storage medium in the form of a programming module. When the command is executed by one or more processors (e.g., the processor 120), the one or more processors may execute a function corresponding to the command. The computer-readable storage medium may be, for example, the memory 130. At least some of the programming modules may be implemented (e.g., executed) by, for example, the processor 120. At least a part of the programming module may, for example, include a module, a program, a routine, a set of instructions, or a process for performing at least one function.

The computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a read only memory (ROM), a random access memory (RAM), and a flash memory. In addition, the program instructions may include high class language codes, which can be executed in a computer by using an interpreter, as well as machine codes made by a compiler. Any of the hardware devices as described above may be configured to work as one or more software modules in order to perform the operations according to various embodiments of the present disclosure, and vice versa.

The above-described components of the electronic device 101, or 1301, according to the present disclosure may each be configured with one or more components, and names of the components may vary according to the type of the electronic device 101, or 1301. The electronic device 101, or 1301, according to the present disclosure may include at least one of the above-described components, some of which can be omitted, or may further include other additional components. In addition, some of the components of the electronic device 101, or 1301, according to the present disclosure are configured as one entity by being combined with one another, so the functions of the components, which are defined before the combination, may be performed in the same manner.

The term "module" used in the various embodiments of the present disclosure may refer to, for example, a unit including one or more combinations of hardware, software, and firmware. The "module" may be interchangeable with a term, such as a unit, logic, a logical block, a component, or a circuit. The "module" may be the smallest unit of an integrated component or a part thereof. The "module" may be a minimum unit for performing one or more functions or a part thereof. The "module" may be mechanically or electronically implemented. For example, the "module" according to various embodiments of the present disclosure may include at least one of an application-specific integrated circuit (ASIC) chip, a field-programmable gate array (FPGA), and a programmable-logic device for performing certain operations, which are now known or will be developed in the future.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed in a different order, some of the operations may be omitted, or other operations may be added.

According to various embodiments, a storage medium storing commands is provided. The commands are configured to allow one or more processors to execute one or more operations when the commands are executed by the one or more processors. The one or more operations may include: configuring one or more categories in a hierarchical structure; mapping one or more contents and the one or more categories based on at least one piece of information on the one or more contents and information on the categories; and when content-related information of each category determined according to the mapping meets a preset condition, updating the hierarchical structure of the categories based on the preset condition.

Exemplary embodiments of the present disclosure shown and described in this specification and the drawings correspond to specific examples presented in order to easily describe technical contents of the present disclosure and to help comprehension of the present disclosure, and are not intended to limit the scope of the present disclosure. Therefore, it should be construed that, in addition to the embodiments disclosed herein, all modifications and changes or modified and changed forms derived from the technical idea of the present disclosure fall within the scope of the present disclosure.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. A method of classifying at least one image in an electronic device having an electronic processor, a display, and a memory storing one or more contents comprising the at least one image, one or more contents, the method comprising:
    storing, in the memory, information related to a plurality of categories forming a hierarchical structure;
    mapping via the electronic processor, each of the at least one image from the memory to one among the plurality of categories based on at least one piece of information on the at least one image and information on the plurality of categories;
    when content-related information of a specific category of a plurality of categories determined according to the mapping meets a preset condition related to a number of images mapped to the specific category, modifying, via the electronic processor, the hierarchical structure associated with the specific category, wherein modifying the hierarchical structure of the categories comprises:
        merging the specific category into a higher category in the hierarchical structure when a number of contents of the specific category is less than a first preset number, and
        classifying the specific category into one or more lower categories in the hierarchical structure when the number of contents of the specific category is greater than a second preset number; and
    in response to a request for displaying the at least one image, displaying, via the display, the at least one image based on the modified updated hierarchical structure,
    wherein the updated hierarchical structure reduces deviation of a number of images mapped to one or more categories of the plurality of categories after reclassifying the categories in the updated hierarchical structure.

2. The method of claim 1, further comprising displaying lists of the one or more images based on the modified hierarchical structure of the categories.

3. The method of claim 1, wherein the content-related information of each category is at least one selected from a number of contents mapped to each category, capacities of contents mapped to each category, and proportions of one or more objects included in the contents mapped to each category.

4. The method of claim 1, wherein the preset condition further comprises at least one selected from a condition in which a number of contents mapped to each category is different from a preset number, a condition in which the number of contents mapped to each category is greater than the preset number, a condition in which the number of contents mapped to each category is less than the preset number, a condition in which capacities of contents mapped to each category are larger than preset capacities, a condition in which the capacities of the contents mapped to each category are smaller than the preset capacities, a condition in which proportions of one or more objects included in the contents mapped to each category are greater than preset proportions, and a condition in which the proportions of the one or more objects included in the contents mapped to each category are less than the preset proportions.

5. The method of claim 4, wherein the preset number varies depending on each of the one or more categories, and is configured based on at least one selected from a total number of contents mapped to the one or more categories, a total number of categories, and a number of user accesses to the one or more categories.

6. The method of claim 1, further comprising:
    receiving analysis information on one or more contents from a second electronic device; and
    identifying categories of the contents based on the analysis information.

7. The method of claim 6, further comprising:
    transmitting one or more contents to the second electronic device; and
    receiving analysis information on the transmitted contents from the second electronic device.

8. The method of claim 6, further comprising receiving the one or more contents and analysis information on the one or more contents from the second electronic device.

9. An electronic device comprising:
a display configured to display at least one image;
a memory configured to store one or more contents comprising the at least one image and information related to a plurality of categories configured in a hierarchical structure; and
a controller configured to:
map each of the at least one image from the memory to one among the plurality of categories based on at least one piece of information on the at least one image and information on the plurality of categories,
when content-related information of a specific category determined according to the mapping meets a preset condition related to a number of images mapped to the specific category, to modify the hierarchical structure associated with the specific category resulting in a different hierarchical structure of categories, wherein modifying the hierarchical structure of the categories comprises:
merging the specific category into a higher category in the hierarchical structure when a number of contents of the specific category is less than a first preset number, and
classifying the specific category into one or more lower categories in the hierarchical structure when the number of contents of the specific category is greater than a second preset number, and
in response to a request for displaying the at least one image, to display the at least one image based on the modified hierarchical structure,
wherein the updated hierarchical structure reduces deviation of a number of images mapped to one or more categories of the plurality of categories after reclassifying the categories in the updated hierarchical structure.

10. The electronic device of claim 9, further comprising a display unit configured to classify the one or more images according to the modified hierarchical structure of the categories.

11. The electronic device of claim 9, wherein the content-related information of each category is at least one selected from a number of contents mapped to each category, capacities of contents mapped to each category, and proportions of one or more objects included in the contents mapped to each category.

12. The electronic device of claim 9, wherein the preset condition further comprises at least one selected from a condition in which a number of contents mapped to each category is different from a preset number, a condition in which the number of contents mapped to each category is greater than the preset number, a condition in which the number of contents mapped to each category is less than the preset number, a condition in which capacities of contents mapped to each category are larger than preset capacities, a condition in which the capacities of the contents mapped to each category are smaller than the preset capacities, a condition in which proportions of one or more objects included in the contents mapped to each category are greater than preset proportions, and a condition in which the proportions of the one or more objects included in the contents mapped to each category are less than the preset proportions.

13. The electronic device of claim 12, wherein the preset number varies depending on each of the one or more categories, and is configured based on at least one selected from a total number of contents mapped to the one or more categories, a total number of categories, and a number of user accesses to the one or more categories.

14. The electronic device of claim 9, wherein the controller is further configured to analyze the one or more contents and identify categories of the one or more contents according to the analysis.

15. The electronic device of claim 9, wherein the controller is further configured to receive analysis information on the one or more contents from a second electronic device and identify categories of the one or more contents according to the analysis information.

16. The electronic device of claim 15, wherein the controller is further configured to transmit the one or more contents to the second electronic device and receive analysis information on the transmitted one or more contents from the second electronic device.

17. The electronic device of claim 15, wherein the controller is further configured to receive the one or more contents and the analysis information on the one or more contents from the second electronic device.

18. A non-transitory computer-readable recording medium having a program recorded therein to be executed in a computer, the program comprising executable commands for performing a process to be performed by a processor, the process comprising:
configuring a plurality of categories in a hierarchical structure;
mapping each of at least one image from the memory to one among the plurality of categories based on at least one piece of information on the at least one image and information on the plurality of categories;
when content-related information of a specific category determined according to the mapping meets a preset condition related to a number of images mapped to a specific category, modifying the hierarchical structure associated with the specific category resulting in a different hierarchical structure of categories, wherein modifying the hierarchical structure of the categories comprises:
merging the specific category into a higher category in the hierarchical structure when a number of contents of the specific category is less than a first preset number, and
classifying the specific category into one or more lower categories in the hierarchical structure when the number of contents of the specific category is greater than a second preset number; and
in response to a request for displaying the at least one image, displaying the at least one image based on the modified hierarchical structure,
wherein the updated hierarchical structure reduces deviation of a number of images mapped to one or more categories of the plurality of categories after reclassifying the categories in the updated hierarchical structure.

* * * * *